United States Patent
Minwalla et al.

(10) Patent No.: US 10,296,551 B2
(45) Date of Patent: May 21, 2019

(54) ANALYTICS FOR A DISTRIBUTED NETWORK

(71) Applicant: Juniper Networks, Inc., Sunnyvale, CA (US)

(72) Inventors: Nosherwan Minwalla, San Francisco, CA (US); Jayabharat Boddu, Los Altos, CA (US); Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 466 days.

(21) Appl. No.: 14/958,466

(22) Filed: Dec. 3, 2015

(65) Prior Publication Data
US 2017/0091204 A1  Mar. 30, 2017

Related U.S. Application Data

(60) Provisional application No. 62/235,122, filed on Sep. 30, 2015.

(51) Int. Cl.
| G06F 16/9537 | (2019.01) |
| G06F 16/29 | (2019.01) |
| H04L 12/24 | (2006.01) |
| H04L 12/26 | (2006.01) |

(52) U.S. Cl.
CPC .......... *G06F 16/9537* (2019.01); *G06F 16/29* (2019.01); *H04L 41/12* (2013.01); *H04L 41/142* (2013.01); *H04L 43/026* (2013.01); *H04L 43/04* (2013.01); *H04L 43/062* (2013.01); *H04L 43/12* (2013.01); *H04L 41/044* (2013.01)

(58) Field of Classification Search
None
See application file for complete search history.

(56) References Cited

U.S. PATENT DOCUMENTS 7,185,103 B1    2/2007   Jain
8,839,171 B1 *  9/2014   Varadarajan ........ G06F 17/5045
                                                716/113
(Continued)

FOREIGN PATENT DOCUMENTS

WO    2005109754 A1   11/2005
WO    2012122435 A2    9/2012

OTHER PUBLICATIONS

Extended Search Report from counterpart European Application No. 16190891.8, dated Feb. 24, 2017, 9 pp.

(Continued)

*Primary Examiner* — Tuankhanh D Phan
(74) *Attorney, Agent, or Firm* — Shumaker & Sieffert, P.A.

(57) ABSTRACT

One example method includes receiving, by a central analytics system, a query for traffic flow data associated with a geographically distributed network of network devices, outputting, by the central analytics system, the query to a plurality of analytics pods, wherein each of the plurality of analytics pods is coupled to a storage unit of a network device within the geographically distributed network, and, responsive to outputting the query, receiving, by the central analytics system and from the plurality of analytics pods, results of the query, wherein the results include at least the traffic flow data from the plurality of analytics pods based on the query.

25 Claims, 8 Drawing Sheets

(56) References Cited

U.S. PATENT DOCUMENTS

2007/0058631 A1\* 3/2007 Mortier .............. H04L 41/042
370/392
2014/0280338 A1 9/2014 Metz et al.
2015/0120959 A1 4/2015 Bennett et al.

OTHER PUBLICATIONS

Cisco, "Introduction to Cisco IOS NetFlow—A Technical Overview," Cisco IOS NetFlow, May 2012, 12 pp.
Juniper Networks, Inc., "Traffic Sampling, Forwarding, and Monitoring Feature Guide for Routing Devices," May 13, 2015, 314 pp.
Juniper Networks, Inc., "Juniper Flow Monitoring—J-Flow on J Series Services Routers and Branch SRX Series Services Gateways," Mar. 2011, 10 pp.
Kompella et al. "Virtual Private LAN Service (VPLS) Using BGP for Auto-Discovery and Signaling" Network Working Group, RFC 4761, Jan. 2007, 26 pgs.
Zimmermann, "OSI Reference Model—the ISO Model of Architecture for Open Systems Interconnection," published in IEEE Transactions on Communications, vol. 28, No. 4, dated Apr. 1980, 8 pp.
Response filed Sep. 22, 2017 to the Extended Search Report dated Feb. 24, 2017, from counterpart European Application No. 16190891.8, 13 pp.
Examination Report from counterpart European Application No. 16190891.8, dated Oct. 22, 2018, 7 pp.
Response filed Feb. 21, 2019 to the Examination Report from counterpart European Application No. 16190891.8, dated Oct. 22, 2018, 21 pp.
Office Action and Translation from counterpart Chinese Application No. 2016108656713, dated Jan. 3, 2019, 19 pp.

\* cited by examiner

ANALYTICS FOR A DISTRIBUTED NETWORK

This application claims priority from U.S. Provisional Application Ser. No. 62/235,122, filed Sep. 30, 2015, the entire content of which is incorporated herein by reference.

TECHNICAL FIELD

The disclosure relates to computer networks and, more specifically, to analyzing a distributed network.

BACKGROUND

A computer network is a collection of interconnected computing devices that exchange data and share resources. In a packet-based network, the computing devices communicate data by dividing the data into small blocks called packets. Devices within the network, such as routers and switches, forward the packets through the network from a source device to a destination device. The destination device extracts the data from the packets and assembles the data into its original form.

Various protocols exist that allow the intermediate networks devices, such as the routers and switches, to collect and report traffic statistics. For example, the network devices deploy sampling mechanisms that collect traffic statistics on interfaces of the device where traffic is received and/or transmitted. In accordance with the protocols, a network device may periodically export records containing traffic statistics to a centralized device referred to as a packet flow collector of "flow collector." In many network environments, the flow collector may receive traffic flow information via traffic flow packets sent from various network locations. Consequently, a network administrator can use the packet flow collector to analyze overall network traffic flow. Example protocols for reporting traffic records to a flow collector include NetFlow® by Cisco Systems® and JFlow® by Juniper Networks®.

SUMMARY

In general, techniques are described that allow a central analytics system to analyze network characteristics, and in particular performance characteristics, of multiple network devices in a distributed network, such as a geographically distributed network. As described herein, the techniques allow for the central analytics system to automatically analyze such characteristics in response to one or more queries, where the central analytics system is configured to distribute the queries to multiple different analytics pods in the distributed network and aggregate query results, as will be described in further detail below.

In one example, a method includes receiving, by a central analytics system, a query for traffic flow data associated with a geographically distributed network of network devices, outputting, by the central analytics system, the query to a plurality of analytics pods, wherein each of the plurality of analytics pods is coupled to a storage unit of a network device within the geographically distributed network, and, responsive to outputting the query, receiving, by the central analytics system and from the plurality of analytics pods, results of the query, wherein the results include at least the traffic flow data from the plurality of analytics pods based on the query.

In one example, a central analytics system includes at least one processor. The at least one processor is configured to receive a query for traffic flow data associated with a geographically distributed network of network devices, output the query to a plurality of analytics pods, wherein each of the plurality of analytics pods is coupled to a storage unit of a network device within the geographically distributed network, and, responsive to outputting the query, receive, from the plurality of analytics pods, results of the query, wherein the results include at least the traffic flow data from the plurality of analytics pods based on the query.

In one example, a method includes receiving, by an analytics pod and from a central analytics system, a query for traffic flow data, wherein the analytics pod is included in a hierarchical arrangement of analytics pods that are each coupled to a storage unit of a network device within a distributed network of network devices, and wherein the hierarchical arrangement is based on a topology of the distributed network. The example method further includes outputting, by the analytics pod, the query to one or more child analytics pods associated with the analytics pod, wherein the one or more child analytics pods are children of the analytics pod in the hierarchical arrangement of analytics pods, responsive to outputting the query, receiving, by the analytics pod and from the one or more child analytics pods, results of the query, wherein the results include at least flow data from the one or more child analytics pods, and outputting, by the analytics pod and to the central analytics system, the results of the query.

In one example, a device includes at least one processor. The at least one processor is configured to receive, from a central analytics system, a query for traffic flow data, wherein the device comprises an analytics pod that is included in a hierarchical arrangement of analytics pods that are each coupled to a storage unit of a network device within a distributed network of network devices, and wherein the hierarchical arrangement is based on a topology of the distributed network. The at least one processor is further configured to output the query to one or more child analytics pods, wherein the one or more child analytics pods are children of the analytics pod in the hierarchical arrangement of analytics pods, and, responsive to outputting the query, receive, from the one or more child analytics pods, results of the query, wherein the results include at least flow data from the one or more child analytics pods. The at least one processor is further configured to output, to the central analytics system, the results of the query.

The details of one or more embodiments of the disclosure are set forth in the accompanying drawings and the description below. Other features, objects, and advantages of the disclosure will be apparent from the description and drawings, and from the claims.

DETAILED DESCRIPTION

The amount of telemetry and performance data produced by routers and switches continues to grow at a high rate. The drivers for this growth include ever increasing data plane traffic, and there is an interest in hardware solutions that can produce telemetry inline without impacting routing performance, along with cheaper and faster storage and devices capable of analyzing the data. Most networks at scale are geographically distributed and are decentralized, and they may also be connected together using wide-area network (WAN) links, which are typically several orders of magnitude more expensive than local-area network (LAN) connections.

While networks are often distributed and decentralized, a centralized or aggregated view generated by a central analytics system of a distributed analytics system is useful in viewing the networks in a global and holistic manner. In particular, the centralized or aggregated view generated by the central analytics system may provide several useful aspects. First, the centralized or aggregated view may provide global visibility of the topology (e.g., physical and/or logical) of the networks. Second, the centralized or aggregated view may provide information of characteristics, in particular performance characteristics, of packet flows at each network device within the distributed and decentralized network. Additionally, the centralized or aggregated view may provide specific flow information or queue utilization extracted across the network.

The central analytics system of such a distributed analytics system may also reduce the need for expensive WAN bandwidth, which would normally be required to aggregate all telemetry collected throughout the network in a central repository. The central analytics system of a distributed analytics system may also use analytics pods that are hierarchically distributed and connected to the central analytics system to overcome the challenge of local analysis. Conventionally, the user would need to determine which local network device to introspect based on topology, flow information, and routing tables. However, in some examples, the central analytics system may maintain databases on the topology, flow information, and routing tables in real time, thereby allowing the central analytics system to determine which local network device to introspect even when there is congestion in the network, and conventionally it would not have been as straightforward for the user to identify the local network device. In some examples, the central analytics system may provide security applications with a comprehensive view of the network as a whole, which may provide enhanced capabilities in determining threats and abnormal traffic patterns.

Figure 1A:
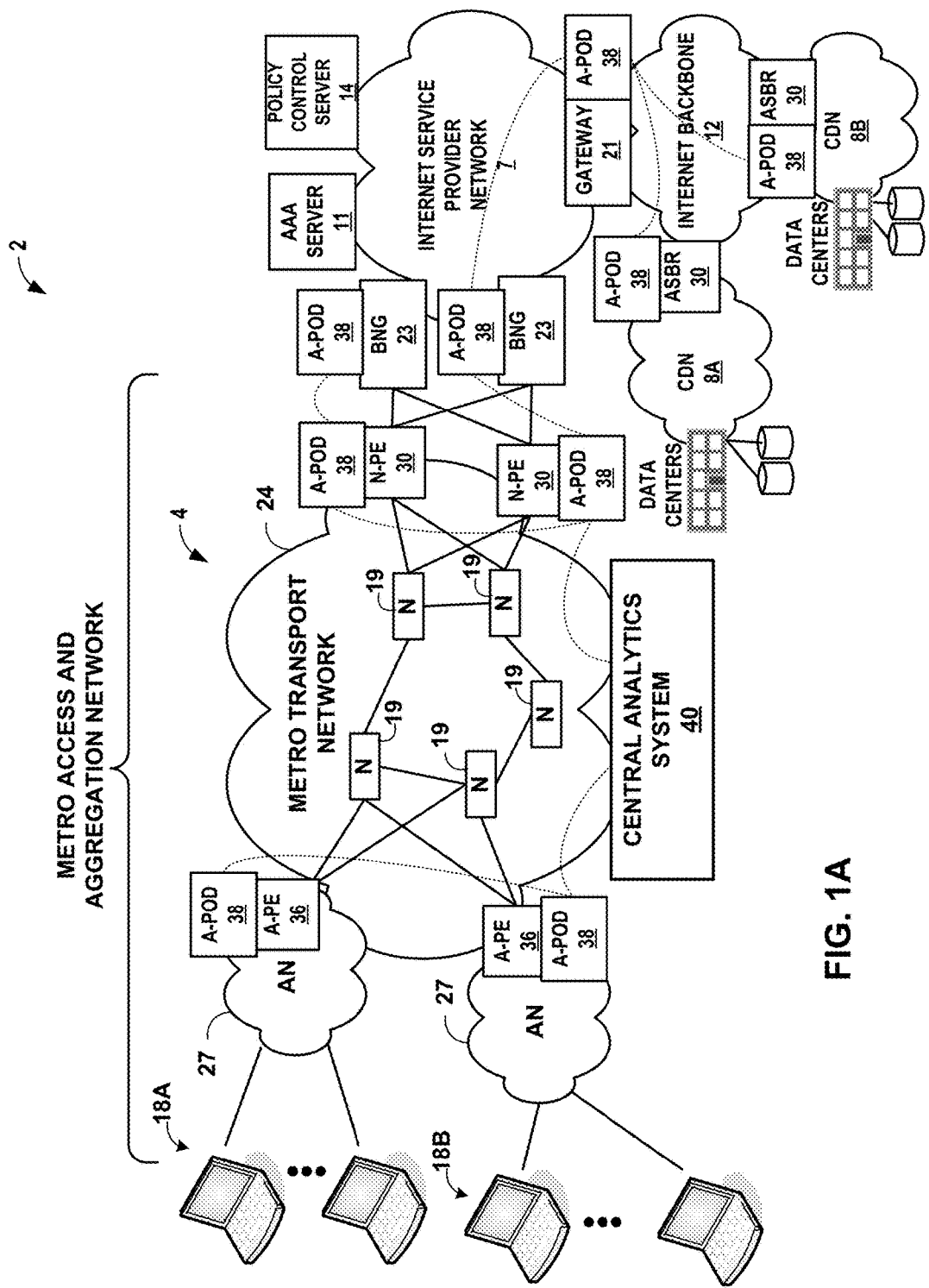
FIG. 1A is a block diagram illustrating an example network system that includes a distributed analytics system, in accordance with techniques of the disclosure.
Figure 1B:
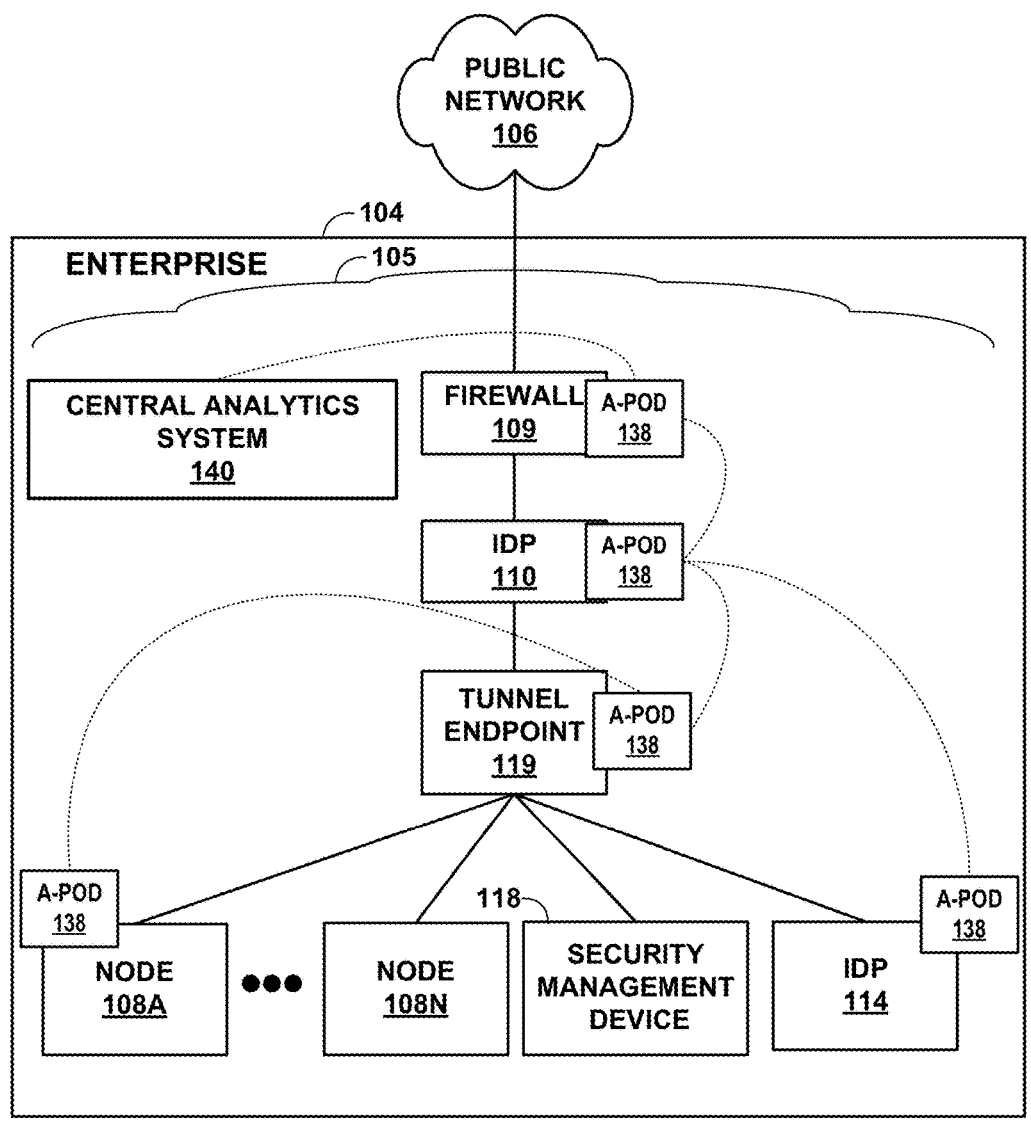
FIG. 1B is a block diagram illustrating an example enterprise network system that includes a distributed analytics system, in accordance with techniques of the disclosure.

FIG. 1A is a block diagram illustrating an example network system 2 in accordance with techniques described herein. FIGS. 1A-1B provide non-limiting examples of one or more networks in which various techniques of the present disclosure may be implemented. As shown in the example of FIG. 1A, network system 2 includes a metro access and aggregation network 4 that is coupled to an Internet service provider network 7. In general, Internet service provider network 7 is typically owned by an Internet Service Provider (ISP) and operated as a private network that provides packet-based network services to subscriber devices 18A, 18B (herein, "subscriber devices 18"). Subscriber devices 18 may be, for example, personal computers, laptop computers or other types of computing devices associated with subscribers, e.g., a 3G wireless card, wireless-capable netbooks, video game devices, pagers, smart phones, personal data assistants (PDAs), or any other suitable subscriber device. Each of subscriber devices 18 may run a variety of software applications, such as word processing and other office support software, web browsing software, software to support voice calls, video games, videoconferencing, and email, among others. That is, Internet service provider network 7 provides authentication and establishment of network access for subscriber devices 18 such that subscriber device 18 may begin exchanging data packets with one or more content data networks (CDNs) 8A-8B (hereinafter, "CDNs 8" or "CDN 8") by way of Internet backbone 12.

In general, each CDN 8 is typically a private network of interconnected devices that cooperate to distribute content to clients using one or more services. Each of CDN 8 may include one or more data centers having data servers, web servers, application servers, databases, computer clusters, mainframe computers, and any other type of server, computing element, and/or database that may be employed by a content service provider to facilitate the delivery of content to subscriber devices 18 via Internet backbone 12 and Internet service provider network 7. Such content may include, for instance, streaming media files, data files, software, domain name system information, documents, and database query results, among others. Accordingly, examples of services offered by CDN 8 may include hypertext transfer protocol (HTTP), HTTP-based adaptive streaming, Real-Time Streaming Protocol (RTSP) streaming, other media streaming, advertising, file transfer protocol (FTP), and others.

In the example of FIG. 1A, metro transport network 24 may, in some cases, provide layer two (L2) transport services for network traffic associated with subscriber devices 18. Metro transport network 24 typically includes internal transport nodes ("N") 19, such as Ethernet switches and underlying transport systems for transporting, multiplexing and switching communications through high-speed links between access provider edge routers (A-PEs) 36 and network provider edge routers (N-PE) 30. Although, for simplicity, only a single Internet service provider network 7 is shown, metro transport network 24 may provide metro access, aggregation and transport of packets for subscriber devices 18 of a plurality of different Internet service providers. In general, metro transport network 24 is typically owned and operated by a metro carrier while each of Internet service provider networks 7 is own and operated by a separate Internet service provider.

In this example of FIG. 1A, A-PEs 36 operate at the border of metro transport network 24 and provide connectivity for access networks (ANs) 27 respectfully. In general, ANs 27 provide subscriber devices 18 with access to metro transport network 24. A-PEs 36, for example, typically include functionality to aggregate output from one or more endpoints associated with subscriber devices 18 into a higher-speed uplink to metro transport network 24. For example, subscriber devices 18 may connect to local customer premise equipment (CPE) such as DSL or cable modems, and A-PEs 36 may comprise digital subscriber line access multiplexers (DSLAMs) or other switching devices. Local CPEs of subscriber devices 18 may utilize a Point-to-Point Protocol (PPP), such as PPP over Asynchronous Transfer Mode (ATM) or PPP over Ethernet (PPPoE), to communicate with A-PEs 36. PPP may be supported on lines such as digital subscriber lines (DSLs) that connect endpoint computing devices 18 with a network switch. In other embodiments, endpoint subscriber computing devices 18 may utilize a non-PPP protocol to communicate with A-PEs 36. Other embodiments may use other lines besides DSL lines, such as cable, Ethernet over a T1, T3 or other access links.

In general, subscriber devices 18 are devices of customers of an Internet service provider that owns and operates Internet service provider network 7. As such, Internet service provider network 7 handles authentication and session establishment so as to provide network access to subscriber devices 18. Broadband network gateways (BNG) 23 provide routing and switching functions for connectivity to metro transport network 24 via N-PEs 30 and provide endpoints for and management of IP sessions established for subscriber devices 18. In another example, BNGs 23 may be a Broadband Remote Access Servers (BRASs) or other routing device that provide anchor points for subscriber sessions.

Upon authentication of a given subscriber device 18, Internet service provider network 7 allocates a private IP address to the subscriber from the IP domain of the service provider and may provide layer three (L3) services for communication sessions associated with the subscribers. For example, AAA server 11 of service provider network 7 is typically an authentication, authorization and accounting (AAA) server to authenticate the credentials of a subscriber requesting a network connection. The AAA server 11 may be, for example, a Remote Authentication Dial-In User Service (RADIUS) server. Upon authenticating a network access request from a subscriber device 18, AAA server 11 assigns a layer three (L3) network address (e.g., a private IPv4 or IPv6 network address) for receiving data services through Internet service provider network 7. Policy control server 14 represents a network device that provides a Policy Control and Charging Rules Function (PCRF) for subscriber devices 18.

In this way, layer two (L2) network functions and layer three (L3) network functions are generally split between metro transport network 24 and Internet service provider network 7. As one example, metro transport network 24 executes a Virtual Private Local Area Network Service (VPLS) that enables metro transport network 24 to operate as an L2 network that switches L2 traffic for subscriber devices 18 L3 functionality, e.g., L3 address assignment and routing for subscriber devices 18 is handled by the subscriber's respective Internet service provider, i.e., ISP network 7 in this example. For example, by executing the VPLS service, metro transport network 24 transports L2 communications, such as Ethernet packets, using pseudowires to carry encapsulated L2 communications. More information concerning the use of VPLS can be found in RFC 4761 entitled "Virtual Private LAN Service (VPLS) Using BGP for Auto-Discovery and Signaling," dated January 2007, which is hereby incorporated by reference as if fully set forth herein. Reference to network layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein.

After authentication and establishment of network access through Internet service provider network 7, any one of subscriber devices 18 may begin exchanging data packets with CDNs 8. During this process, the private IP addresses assigned by Internet service provider network 7 to subscriber devices 18 may be translated to public addresses associated with routing prefixes of Internet service provider network 7 for purposes of packet-based communication on Internet backbone 12. Moreover, gateway 21 provides layer three (L3) routing functions for reaching subscriber devices 18 through Internet service provider network 7. That is, gateway 21 advertises L3 reachability information (e.g., routes) for reaching the public address prefixes associated with Internet service provider network 7. Upon receiving the layer three (L3) routing information, autonomous system border routers (ASBRs) 30 update their respective routing tables with network layer reachability information for reaching address prefixes advertised by Internet service provider network(s) 7. As such, using L3 routing information for reaching subscriber devices 18 and without learning L2 network addresses for the subscribers, packet-based content provided by CDNs 8 and addressed to subscriber devices 18 flows through Internet backbone 12 to Internet service provider network 7 for delivery to individual subscriber devices 18 by way of metro transport network 24 and access networks 27. Although not shown, Internet service provider network 7 may include other devices to provide other services, such as security services, load balancing, billing, deep-packet inspection (DPI), and other services for traffic traversing Internet service provider network 7.

In general, network traffic within network system 2, such as packet flows between CDNs 8 and subscriber devices 18, can traverse the physical network of network system 2 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as Transmission Control Protocol (TCP) or User Datagram Protocol (UDP), and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (MPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In some examples, network system 2 may include central analytics system 40 connected to a plurality of analytics pods 38 (A-PODs 38) hierarchically distributed throughout network system 2 based on network topology. Each of the A-PODs 38 are coupled to a network device that receive packet flows, generates traffic flow data, and transmit the traffic flow data to one of a parent analytics pod 38 or central analytics system 40 based on the hierarchical distribution. A-PODs 38 may be part of or comprise dedicated computers or specialized devices, network routers, or other network devices that can be used for traffic analysis, including but not limited to gateways, switches, hubs, servers, workstations, and the like.

The term "packet" is used herein to generally describe a unit of data communicated between network devices in conformance with a packet-based communication protocol. The principles of the disclosure are readily applicable to systems implementing any of a variety of protocols, such as TCP, UDP, ATM, Frame Relay, and the like. Accordingly, "packet" is used to encompass any such unit of data, and may be interchanged with the term "cell," or other similar terms used in such protocols to describe a unit of data communicated between resources within the network.

The phrase "traffic flow data" is used herein to describe data that includes either collected traffic flow data or aggregated traffic flow data. As one example, collected traffic flow data may correspond to "cflowd" packets generated according to a flow analysis tool such as NetFlow™ created by Cisco Systems. As another example, aggregate traffic flow data may correspond traffic flow information generated from the aggregation of cflowd packets generated according to the flow analysis tool such as NetFlow™ created by Cisco Systems. As described herein, these or other traffic flow data can be exported for transmission in a hierarchical distributed manner. In this way, transmission of traffic flow data can occur with reduced bandwidth and minimal traffic flow data loss to central analytics system 40, even if a portion of A-PODs 38 are simultaneously sending traffic flow data to central analytics system 40.

A-PODs 38 may be connected to one or more collectors (shown in FIG. 4) that accumulate flow statistics for traffic of an individual network device. In some examples, the one or more collectors may be part of a network device, e.g., part of gateway 21, BNG 23, N-PE 30, and A-PE 36. More specifically, each A-PODs 38 may be connected to one or more collectors that receive or otherwise capture packets from one or more links into the individual network device, and compute flow statistics indicative of packet flow over the one or more links. A-PODs 38 may receive traffic flow data as the one or more collectors receive packets, traffic flow modules of the one or more collectors may associate the received packets with respective packet flows, and update the statistics for the packets flows. For example, the traffic flow modules of the one or more collectors may maintain a packet count, byte count, source IP address, destination IP address, next hop IP address, input interface information, output interface information, total octets sent, flow start time, flow end time, source and destination port numbers, TCP flags, IP type of service, originating AS, source address prefix mask bits, destination address prefix mask bits, or the like, for each packet flow.

The collectors may provide accounting capabilities for maintaining accurate flow statistics for all of the packets received by the one or more collectors. For example, the traffic flow modules of the collectors may monitor and generate statistics for high traffic rates, even core traffic rates of the Internet, including but not limited to OC-3, OC-12, OC-48, OC-192 and higher or lower rates. The particular packet flows being monitored may be defined, in some examples, at least by source and/or destination network addresses. Additionally, other routing information within packets may readily be used to define the packet flows for which flow statistics are maintained, such as MPLS labels, VPN labels, Class of Service (CoS) information, and the like. In this manner, statistics for particularized packet flows can be maintained to a level of granularity desired for effective traffic analysis including aggregation of traffic flow data.

A-PODs 38 may receive from the raw storage of the one or more collectors an output of collected traffic flow data and/or aggregated traffic flow data. The collected traffic flow data, in particular, may include the five-tuple and/or statistical data for each flow, such as, in some non-limiting examples, a number of packets, a number of bytes, a time of capturing a first packet for the flow, a time of capturing a most recent packet for the flow, an incoming interface, an outgoing interface, a source/destination network mask, a source/destination Autonomous System (AS) number, or the like. In some examples, the aggregated traffic flow data or traffic flow information may comprise a portion of the collected traffic flow data or a summary of the collected traffic flow data. In some examples, A-PODs 38 receive traffic flow data from the one or more collectors, and store the traffic flow data within a database or other suitable data structure. In addition, analytics pod 38 may analyze the received traffic flow data to identify any suspicious packet flows. For example, A-PODs 38 may identify packet flows arising from Denial of Service (DOS) attacks and other network security violations. In this manner, analysis of traffic flows through network 2 can improve network reliability and be used to reduce the potential for security breaches or other network events. In addition, analytics pod 38 may provide the traffic flow data to a parent analytics node 38 or central analytics system 40, and central analytics system 40 may use traffic flow data to improve network performance.

A system administrator operating central analytics system 40 may provide a query to central analytics system 40. Central analytics system 40 may communicate the query to some or all of A-PODs 38 based on the query and a topology manager module as described in further detail below. For example, the system administrator may provide a query on any suspicious packet flows in a particular geographical region, and central analytics system 40 may communicate the query to some or all of analytics pods located in the particular geographical region as managed by the topology manager module in a routes database. In this manner, central analytics system 40 may determine the relevant A-PODs 38 and may selectively define the packet flows, and packets within a given flow, that are intercepted for analysis and aggregation.

Additionally or alternatively, all packet flows of an individual network device, or a defined subset of packet flows of an individual network device, may be defined at each A-PODs 38, without administrative direction from central analytics system 48. In some examples, traffic flows may be monitored for every packet. Alternatively, a subset of the transmitted packets may be monitored by selectively sampling one or more packet flows, or by sampling a given packet flow for only a period of time.

As described herein, A-PODs 38 may be configured to transmit traffic flow data (e.g., collected traffic flow data and/or aggregated traffic flow data) to central analytics system 40 based on a distributed hierarchy of A-PODs, which may be based on the network topology. In other words, each of A-PODs 38 may convey the traffic flow data to one of a parent analytics pod 38 or central analytics system 40 based on the distributed hierarchy. In this way, A-PODs 38 may avoid outputting all of the traffic flow data computed by the respective A-PODs 38 to central analytics system 40, which may overload or burden central analytics system 40. Instead, in some examples, analytics pod 38 may output the collected traffic flow data and/or aggregated traffic flow data to a hierarchically related analytics pod 38 (e.g., parent analytics pod), either automatically or in response to queries, which may further aggregate the received traffic flow data with stored traffic flow data. Central analytics system 40 is capable of sending queries to determined ones of A-PODs 38 (e.g., parent analytics pods) based, for example, on network topology and/or flow or route information, and any given parent analytics pod is capable of sending queries to one or more of its children analytics pods in a pod hierarchy to obtain query results, and then aggregate such results, as will be described in further detail below. A given analytics pod 38 may output the collected traffic flow data and/or aggregated traffic flow data to central analytics system 40, which may further aggregate the received traffic flow data with traffic flow data from other A-PODs 38 automatically and/or in response to queries from central analytics system 40.

Consequently, the transmission of traffic flow data from A-PODs 38 to central analytics system 40 can be made both lean and robust, thereby reducing both bandwidth and data loss. For this reason, distributed analytics based on a distributed hierarchy of A-PODs 38 can be extremely useful in ensuring that transmitted traffic flow data will be received by central analytics system 40 without overloading input buffers or other resources of central analytics system 40.

FIG. 1B is a block diagram illustrating an example enterprise computer network system 104 in accordance with techniques described herein. Network 104 includes a private enterprise computing network 105 that is coupled to public network 106, such as the Internet. Public network 106 may include, for example, one or more client computing devices (e.g., subscriber devices 18 as described in FIG. 1A). Firewall 109 protects private enterprise network 105 and, in particular, internal computing nodes 108A-108N (computing nodes 108). Computing nodes 108 represent any private computing device within enterprise network 105, for example, workstations, laptops, file servers, print servers, database servers, web servers, e-mail servers, databases, printers, personal digital assistants (PDAs), smart phones, and other devices. Security management device 118 may manage one or more network security devices of enterprise network 105, e.g., intrusion detection system (IDP) 110, firewall 109, IDP 114, or one or more of computing nodes 108.

In the example of FIG. 1B, enterprise network 105 includes central analytics system 140 and a plurality of A-PODs 138, which may, in some examples, correspond to central analytics system 40 and A-PODs 38 as described in FIG. 1A. A-PODs 138 may be connected to different network devices and distributed hierarchically throughout enterprise network 105. In the example of FIG. 1B, different network devices may include firewall 109, IDP 110, tunnel endpoint 119, node 108A, and IDP 114 and each may be connected with an individual A-POD 138.

A-PODs 138 may receive from the raw storage of the one or more collectors within the connected network device (e.g., IDP 110) an output of collected traffic flow data and/or aggregated traffic flow data from the one or more collectors. The collected traffic flow data may be an analysis of one or more packet flows through the network device. The aggregated traffic flow data may be a summary or characteristic of the collected traffic flow data.

For example, one or more collectors of IDP 110 may monitor traffic flowing between firewall 109 and internal computing nodes 108. In particular, IDP 110 monitors packets of a packet flow, where the packets encapsulate sub-packets of encapsulated packet flows, in addition to normal packets. IDP 110 attempts to determine whether a particular network communication represents a network attack. The network communication may be a standard packet or an encapsulated sub-packet. IDP 110 may first attempt to identify an application associated with the network communication. IDP 110 may also determine whether the network communication represents a multi-layered application.

IDP 110 may also integrate pattern matching with application- and protocol-specific anomaly detection to identify sophisticated attack behaviors. In one example, IDP 110 allows the system administrator to specify attack definitions. The system administrator may specify compound attack definitions.

The attack definitions may specify, for example, any combination of textual and non-textual (e.g., binary) patterns and protocol anomalies to define complex attack signatures. Moreover, IDP 110 may associate particular signatures with protocols of certain applications. For a given communication session intercepted by IDP 110, the IDP attempts to identify the application type and underlying protocol for the packet flows of the session in order to select one or more attack signatures to apply to the packet flows.

In this way, A-POD 138 connected to IDP 110 may receive, from raw storage of IDP 110, traffic flow data based on between firewall 109 and internal computing nodes 108. For example, A-POD 138 may receive collected traffic flow data, which may include the five-tuple and/or statistical data for each flow, such as a number of packets, a number of bytes, a time of capturing a first packet for the flow, a time of capturing a most recent packet for the flow, an incoming interface, an outgoing interface, a source/destination network mask, a source/destination Autonomous System (AS) number, or the like. In another example, A-POD 138 may receive aggregated traffic flow, which may include an identified application associated with the network communication, and whether the network communication represents a multi-layered application.

IDP 110 may also inspect packets before the packets reach tunnel endpoint 119. IDP 110 may identify a sub-packet of a malicious network session that is encapsulated within a particular outer packet. IDP 110 may respond to a detection of such a sub-packet by removing the sub-packet from the outer packet. That is, IDP 110 may reconstruct an outer packet that encapsulates all of the original data except the sub-packet that IDP 110 determined belonged to a malicious network session. IDP 110 forwards to tunnel endpoint 119 packets in which no attack has been detected as well as reconstructed packets.

In this way, A-POD 138 connected to IDP 110 may receive, from raw storage of IDP 110, traffic flow data based on the malicious network session. For example, A-POD 138 may receive collected traffic flow data, which may include the five-tuple and/or statistical data for flow with the malicious network session, such as a number of packets, a number of bytes, a time of identifying the a sub-packet of a malicious network session, a time of capturing a most recent packet for the flow, or the like. In another example, A-POD 138 may receive aggregated traffic flow, which may include identification of the flow with the sub-packet of the malicious network session.

A system administrator operating central analytics system 140 may provide a query to central analytics system 140. Central analytics system 140 may communicate the query to some or all of analytics pods 138 based on the query and a topology manager module as described in more detail in FIG. 2. For example, the system administrator may provide a query on any suspicious packet flows in a particular geographical region, and central analytics system 140 may communicate the query to some or all of analytics pods located in the particular geographical region as managed by the topology manager module in a routes database. In this manner, central analytics system 140 may determine the relevant analytics pods 138 and may selectively define the packet flows, and packets within a given flow, that are intercepted for analysis and aggregation. In this way, in some examples, the system administrator may receive a response based on the aggregated traffic flow data and generated by central analytics system 140 that indicates IDP 110 identified a particular flow with a sub-packet of a malicious network session. Additionally, in some examples, the system administrator may receive additional information based on the collected traffic flow data of IDP as described above.

Additionally or alternatively, all packet flows of an individual network device, or a defined subset of packet flows of an individual network device, may be defined at each A-PODs 138, without administrative direction from central analytics system 140. In some examples, traffic flows may be monitored for every packet. Alternatively, a subset of the transmitted packets may be monitored by selectively sampling one or more packet flows, or by sampling a given packet flow for only a period of time.

As described herein, A-PODs 138 may be configured to transmit traffic flow data (e.g., collected traffic flow data and/or aggregated traffic flow data) to central analytics system 140 in a distributed hierarchy. In other words, each of A-PODs 138 may convey the traffic flow data to one of a parent analytics pod 138 or central analytics system 140 based on the distributed hierarchy. In this way, A-PODs 138 avoid outputting all of the traffic flow data computed by the respective A-PODs 138 to central analytics system 140, which may overload or burden central analytics system 140. Instead, in some examples, A-PODS 138 138 may output the collected traffic flow data and/or aggregated traffic flow data to a hierarchical parent analytics pod that may further aggregate the received traffic flow data with stored traffic flow data. A-PODs 138 may output the collected traffic flow data and/or aggregated traffic flow data to central analytics system 140 that may further aggregate the received traffic flow data with traffic flow data from other A-PODs 138 automatically and/or in response to queries from central analytics system 140.

Consequently, the transmission of traffic flow data from A-PODs 138 to central analytics system 140 can be made both lean and robust, thereby reducing both bandwidth and data loss. For this reason, distributed analytics based on a distributed hierarchy of A-PODs 138 can be extremely useful in ensuring that transmitted traffic flow data will be received by central analytics system 140 without overloading input buffers or other resources of central analytics system 140.

In some examples, instead of providing a query, the system administrator operating central analytics system 140 may receive an automatic response from central analytics system 140. For example, A-POD 138 connected to IPD 110 may be configured to automatically transmit traffic flow data to central analytics system 140. In this example, central analytics system 140 may also be configured to automatically provide a response to the system administrator based on the received traffic flow data from A-POD 138 connected to IPD 110. In this way, the system administrator may be continuously notified of the current state of packet flows through IPD 110.

In other examples, instead of providing a query or an automatic response, the system administrator operating central analytics system 140 may receive a triggered response from central analytics system 140. For example, A-POD 138 connected to IPD 110 may be configured to transmit traffic flow data to central analytics system 140 when the traffic flow data includes information regarding a sub-packet of a malicious network session. In this example, central analytics system 140 may also be configured to provide a response to the system administrator when the received traffic flow data includes the information regarding the sub-packet of the malicious network session. In this way, the system administrator may be notified of only identified sub-packets of a malicious network session.

For purposes of illustration, example interactions between the system administrator, central analytics system 140, and A-PODs 138 connected to IDP 110 have been described above. However, similar and different interactions may occur between the system administrator, central analytics system 140, and any of A-PODs 138 connected to the different network devices according to the type of each network device and the characteristics of the packet flows through the different network devices.

Figure 2:
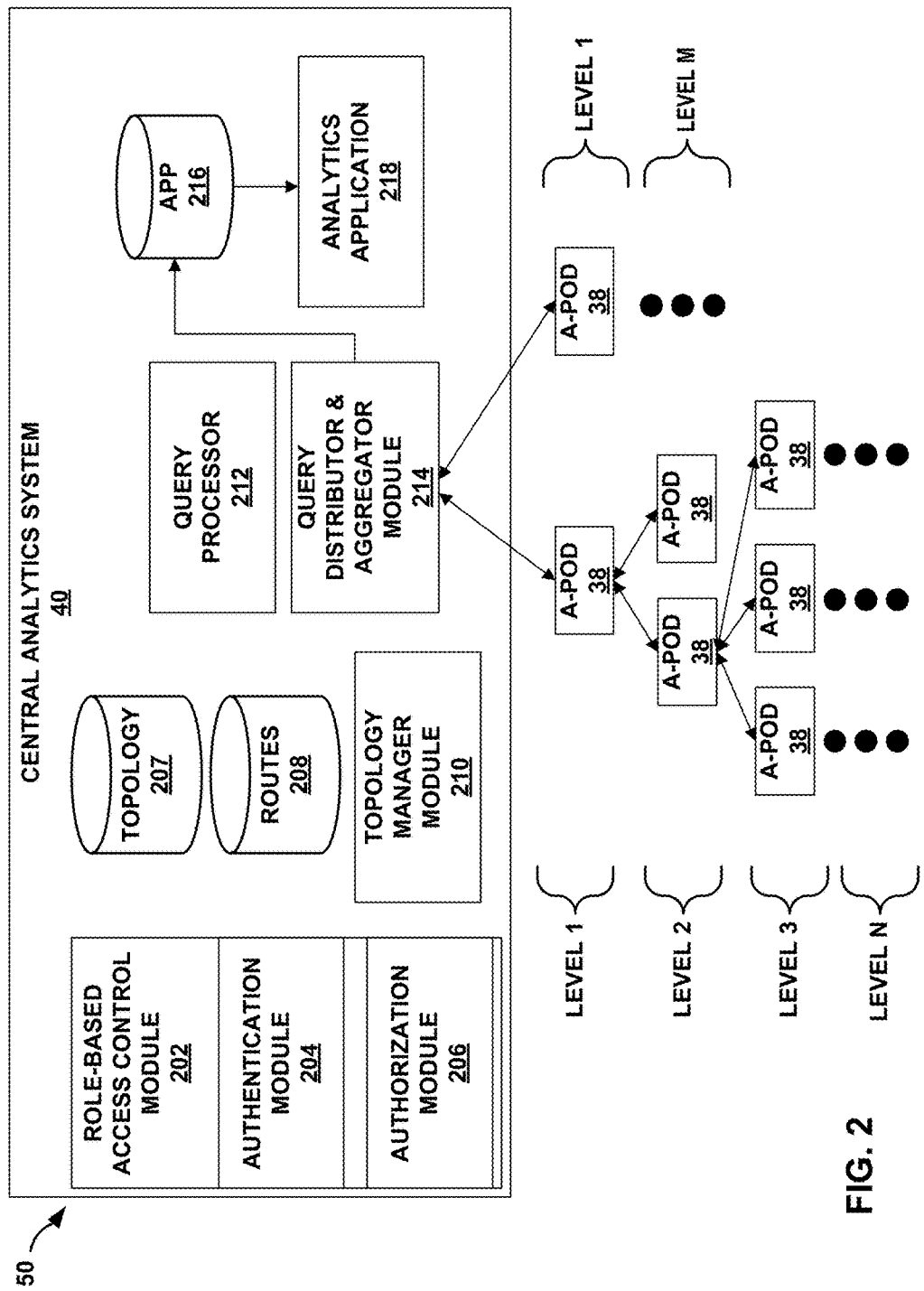
FIG. 2 is a block diagram illustrating further details of a distributed analytics system, in accordance with techniques of the disclosure.

FIG. 2 is a block diagram illustrating further details of distributed analytics system 50, in accordance with techniques of the disclosure. In the example of FIG. 2, distributed analytics system 50 includes a plurality of A-PODs 38 connected to central analytics system 40. Central analytics system 40 includes role-based access control module 202, authentication module 204, authorization module 206, routes database 208, topology manager module 210, topology database 207, query processor 212, query distributor and aggregator module 214, application (APP) database 216, and analytics application 218. Any of the modules as described herein may include or be stored in memory, such as random access memory (RAM), read only memory (ROM), programmable read only memory (PROM), erasable programmable read only memory (EPROM), electronically erasable programmable read only memory (EEPROM), flash memory, and/or may comprise executable instructions for causing the one or more processors to perform the actions attributed to them.

Additionally, any of the modules described herein may also include one or more processors, such as one or more microprocessors, digital signal processors (DSPs), application specific integrated circuits (ASICs), field programmable gate arrays (FPGAs), or any other equivalent integrated or discrete logic circuitry, as well as any combinations of such components.

Role-based control access module 202 allows users of distributed analytics system 50 to be members of one or more groups. In some examples, role-based control access module 202 may include a policy engine that authenticates and authorizes groups of users to execute queries, access data, and/or receive response from central analytics system 40. For example, the policy engine of role-based access control module 202 may include authentication module 204 and authorization module 206. Role-based control access module 202 may also categorize queries and data into classes. In this example, role-based control access module 202 may assign a particular access level to a particular group, allowing only members of a particular group to generate queries categorized in a class that corresponds to the particular access level. Similarly, in another example, authentication module 204 and authorization module 206 may only allow members of the particular group to access data central analytics system 40 according to their assigned access level, and/or to perform particular types of queries for certain data types.

Topology database 207 may be configured to store the overall topology of distributed analytics system 50. Routes database 208 may be a databased configured to store the routing information and/or flow data of distributed analytics system 50.

Topology manager module 210 may maintain topology database 207 and routes database 208. For example, topology manager module 210 may receive indications of the hierarchical relationships between the plurality of A-PODs 38 when topology manager module 210 receives registration and/or initial flow data from one or more of A-PODs 38. In some cases, topology manager module 210 may also update topology database 207, which provides topology information associated with the topology of the distributed system including A-PODs 38, based on user input from a system administrator.

Routes database 208 may include route information and/or flow data. In some cases, routes database 208 may be updated based upon registration and/or initial flow data from one or more of A-PODs 38, which may include information associated with the five-tuple data structure associated with flow data, as described previously. In some cases, user input via a system administrator may also be processed to update routes database 208. In various examples, routes database 208 may be organized and/or filtered based on one or more time-based criteria. For example, such criteria could be used to filter out or identify the most recent route and/flow information associated with A-PODs 38, the route and/or flow information associated with A-PODs in the last week, and the like.

Upon receiving an indication of new A-POD 38 in the distributed system, topology manager module 210 may control topology database 207 to update the overall topology of distributed analytics system 50, and may control routes database 208 to update routing and/or flow data associated with the new A-POD 38. Upon receiving an indication that one of A-PODs 38 has been disconnected or no longer exists in distributed analytics system 50, topology manager module 210 may control topology database 208 to update the overall topology of distributed analytics system 50, and may control routes database 208 to remove the routing and/or flow data associated with the disconnected A-POD 38. In some examples, topology manager module 210 may receive indication of the hierarchical relationships between the plurality of A-PODs 38 from a source other than the A-PODs 38. For example, as noted above, topology manager module 210 may receive an indication of the hierarchical relationships between A-PODs 38 from the system administrator. In another example, topology manager module 210 may receive an indication of the hierarchical relationships between A-PODs 38 from members of a group defined by role-based access control module 202.

In some examples, topology manager module 210 may provide topology information from topology database 207 to one or more of A-PODs 38, such that these A-PODs may utilize such topology information when processing queries from query distributor and aggregator module 214 (e.g., to determine hierarchical relationships between one or more of A-PODs 38, such as one or more child analytics pods of a parent analytics pod). In some examples, one or more of A-PODs 38 may be separately configured with such topology information, such as via a system administrator or other user.

Query processor 212 may process a query from a system administrator a member of a group defined by role-based access control module 202. In some cases, query processor 212 may process such a query during execution of and/or responsive to a request from analytics application 218. In some cases, query processor 212 may receive a query from a system administrator. Upon receiving the query, query processors 212 is configured to determine, via interaction with or based upon input from topology manager module 210, a relevant subset of A-PODs 38 that should receive the query. In one example, query processor 212 may also receive an index or list of A-PODs 38 that have responded and provide the index or list of A-PODs 38 to topology manager module 210, thereby allowing topology manager module 210 to update topology database 207 and routes database 208. In some examples, query processor 212 may include one or more processors, such as one or more microprocessors, digital signal processors (DSPs), application specific integrated circuits (ASICs), field programmable gate arrays (FPGAs), or any other equivalent integrated or discrete logic circuitry, as well as any combinations of such components.

Query distributor and aggregator module 214 may serve as an interface between central analytics system 40 and the hierarchically distributed A-PODs 38. In other words, query distributor and aggregator module 214 may be communicatively coupled to one or more levels of A-PODs 38 within one or more hierarchies, as illustrated in FIG. 2, and may also interface with app database 216. Query distributor and aggregator module 214 may receive the processed query from query processor 212 and the overall topology and routing and/or flow data from topology manager module 210 to distribute the query to the relevant A-PODs 38 based on the hierarchical distribution of A-PODs 38. For example, query distributor and aggregator module 214 may identify particular flows that are pertinent to a given query based upon the route and/or flow information included in routes database 208 (e.g., portion of the distributed network that interface with a particular service and/or destination or route), and may then identify particular A-PODs 38 based further upon this route and/or flow information, as well as the topology information included in topology database 207, which provides information associated with the hierarchical relationships between A-PODs 38. Query distributor and aggregator module 214 may distribute the query to identified A-PODs 38 (e.g., parent A-PODs 38 at the highest level of one or more hierarchies of A-PODs), and these identified A-PODs are further operable, as necessary, to provide response data and/or distribute the queries down the hierarchy of A-PODs and aggregate response data that is provided back to query distributor and aggregator module 214.

After distributing the query to the relevant A-PODs 38, query distributor and aggregator module 214 may receive results including traffic flow data from the relevant A-PODs 38. In some examples, the results may be collected traffic flow data (e.g., non-aggregated traffic flow data) from each of A-PODs 38 that received the query. In other examples, the results may be aggregated traffic flow data (e.g., summarized traffic flow data) from each of A-PODs 38 that received the query. In yet other examples, the results may be a combination of both collected and aggregated traffic flow data from a combination of A-PODs 38 that received the query.

In some examples, query distributor and aggregator module 214 may aggregate the results received from A-PODs 38 that received the query and provide the aggregated results to application database 216 that is configured to store the aggregate results. In other examples, query distributor and aggregator module 214 may aggregate the results received from A-PODs 38 that automatically generate results, and provide the aggregated results to application database 216 that is configured to store the aggregate results. In yet other examples, query distributor and aggregator module 214 may aggregate the results received from A-PODs 38 that generate results based on a trigger event, and provide the aggregated results to application database 216 that is configured to store the aggregate results.

Analytics application 218 may retrieve the aggregated results from application database 216 to generate a centralized view of distributed analytics system 50 based on the aggregated results. In some examples, analytics applications 218 may also receive the initial query from the system administrator or a member of a group defined by the role-based access control module 202, and may provide the query to query processor 212, which triggers the process described above.

The traffic flow data that is queried by central analytics system 40 may be associated with respective data flows in distributed network 50. Central analytics system 40 may receive, from A-PODs 38 in response to a query, at least a portion of the traffic flow data for each of the different respective data flows. For example, if there are two distinct data flows, the query may request first and second portions of the overall traffic flow data associated with the respective first and second data flows. Central analytics system 40 may receive, from A-PODs 38, and in response the query, the first and second portions of the traffic flow data associated with these respective first and second data flows.

As illustrated in FIG. 2, A-PODs 38 are connected to central analytics system 40 to form one or more hierarchies of analytics pods in distributed analytics system 50. Two such hierarchies are illustrated in the example of FIG. 2, each having a top level in the hierarchy (LEVEL 1) and one or more sub-levels. Each of the two LEVEL 1 parent A-PODs 38 in these respective hierarchies may have either N or M LEVELs of children A-PODs 38, respectively, as illustrated, wherein N and M are both integers greater than one. In FIG. 2, A-PODs 38 located at lower level of a given hierarchy (e.g., LEVEL 2) are child A-PODs 38 of one or more respective A-PODs 38 located at a higher level of the given hierarchy (e.g., LEVEL 1). In addition, any given A-POD 38 may serve as both a parent A-POD 38 of respective lower-level A-PODs 38 and also as a child A-POD 38 of a respective higher-level A-POD 38 in a given hierarchy, if applicable. Thus, a particular A-POD 38 may serve, in some cases, as both a parent A-POD and as a child A-POD.

In general, there may be any number of LEVEL 1 parent A-PODs 38 for multiple different hierarchies of A-PODs, each with any number of children A-PODs. In this way, central analytics system 40 may form a network with A-PODs 38 that may be geographically and hierarchically distributed.

In one or more non-limiting use case examples, a system administrator may discover a malicious network session with or without using central analytics system 40. However, upon discovering the malicious network session, the system administrator would not conventionally be able to immediately determine whether a similar and coordinated malicious network session had occurred anywhere else in the network (e.g., network system 2). Using analytics application 218, the system administrator may be able to provide a query to query processor 212 based on information of the previous malicious network session. Query processor 212 may process the query and interface with topology manager module 210 to determine the relevant A-PODs 38 that may have had a similar malicious network session. Query processor 212 and/or topology manager module 210 may access topology database 207 and/or routes database 208 to determine these relevant A-PODs 38 (e.g., one or more parent A-PODs at LEVEL 1 of the one or more hierarchical arrangements of A-PODs).

Query processor 212 may provide the processed query to query distributor and aggregator module 214, along with, in some cases, the topology information from topology database 207. The topology information is associated with the topology of the distributed system and the hierarchical relationships between the A-PODs. In some cases, A-PODs 38 already have access to the topology information (e.g., via system administration), and, in these cases, topology information may not need to be provided to A-PODs by query distributor and aggregator module 214.

As described previously, query distributor and aggregator module 214 may distribute the query to the relevant A-PODs 38 based on the topology and routing and/or flow information. Each A-POD 38 is capable of processing the query by providing result traffic flow data back to query distributor and aggregator 214 or to a parent A-POD based upon data stored locally at the respective A-POD 38. However, each A-POD 38 is also capable of recursively distributing sub-queries down to own or more child A-PODs in the hierarchy, receiving results of traffic flow data from these child A-PODs, and aggregating this data, along with any locally stored data, back up to a parent A-POD in the hierarchy or to query distributor and aggregator module 214.

For example, a relevant A-PODs 38 may receive a query, either from a parent A-POD or from query distributor and aggregator module 214, and respond with results including traffic flow data (e.g., collected and/or aggregated traffic flow data) to one of a parent A-POD 38 or directly to central analytics system 40 if A-POD 38 is a LEVEL 1 A-POD 38. Query distributor and aggregator module 214 may aggregate all the results received in response to the query and provide the aggregated results to application database 216. Analytics application 218 may generate a centralized view based on the aggregated results stored in application database 216. In this way, the system administrator may leverage the discovery of a malicious network session to determine whether a similar malicious network session has occurred at a different network device in a global network. Although a malicious network session has been described, other centralized views may be available including, but not limited to, network optimization and visibility.

In some examples, a parent A-POD 38 may receive a query from central analytics system 40 and output the query to multiple child A-PODs. For example, in the example of FIG. 2, parent A-POD 38 at LEVEL 1 of the hierarchy may output a first query to a first child A-POD 38 at LEVEL 2 of the hierarchy, and may also output a second query to a second child A-POD 38 also at LEVEL 2 of the hierarchy. These first and second queries may, in some cases, be sub-queries of the original query received by the parent A-POD 38.

The parent A-POD 38 may receive, from the first child A-POD 38, results of the first query that include flow data from the first A-POD 38. The parent A-POD 38 may also receive, from the second child A-POD 38, results of the second query that include flow data from the second child A-POD 38. The parent A-POD 38 may then aggregate the results of the first query with the results of the second query, and send, to central analytics system 40, the aggregated results.

In some examples, A-PODs 38 may optionally process queries (e.g., trigger events), which may produce summaries and aggregates of the data. In this way, the summaries and aggregates of the data may then be sent to a parent A-POD 38 in a given hierarchy. The parent A-POD may aggregate this data with any data stored locally at the parent A-POD. This process of data aggregation may be repeated at each level in the hierarchy. In some examples, distributed analytics system 50 may also be considered an intelligent distributed query system. In these examples, distributed analytics system 50 may allow for collection of large scale data (e.g. Netflow, IPFIX, and JVision based exports) for use in network optimization, visibility, and security. Additionally, in some examples, distributed analytics system 50 may be useful in several different types of data collection including IoT, server log analysis, and in general large streams of data coming from network devices separated by WANs.

Figure 3:
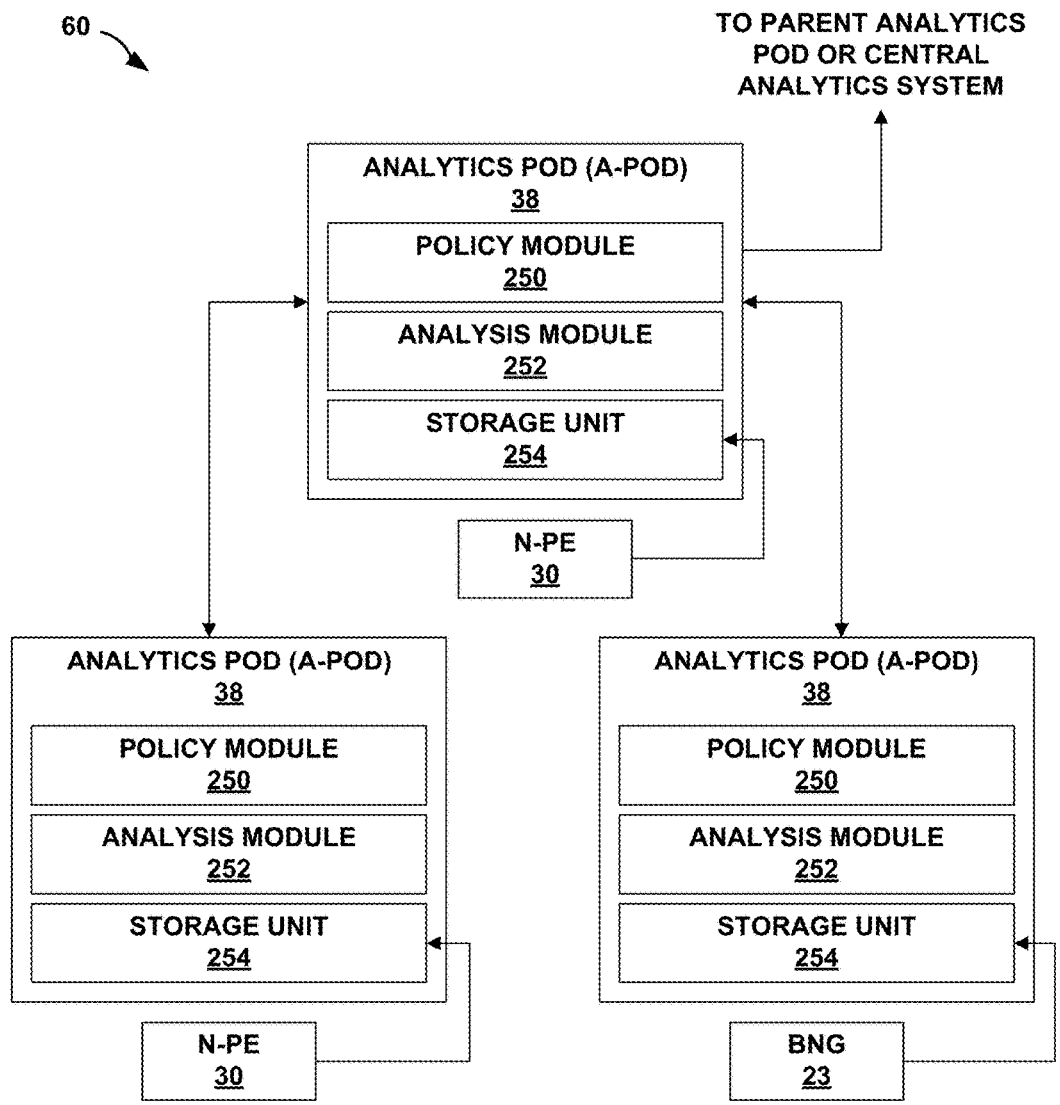
FIG. 3 is a block diagram illustrating further details of a hierarchy of analytics pods in the distributed analytics system, in accordance with techniques of the disclosure.

FIG. 3 is a block diagram illustrating further details of an example hierarchy 60 of A-PODs 38 in a distributed analytics system, in accordance with techniques of the disclosure. In the example of FIG. 3, hierarchy 60 may include a plurality of A-PODs 38, which are described in reference to the examples of FIGS. 1A and 1B. Each of A-PODs 38 includes a policy module 250, an analysis module 252, and a storage unit 254. As illustrated in FIG. 3, storage unit 254 of each of A-PODs 38 is connected to a network device, e.g., N-PE 30 or BNG 23 as described in FIG. 1. However, storage unit 254 of each of A-PODs 38 may be connected to any of the network devices described in FIGS. 1A and 1B, or any other suitable network device.

Any of the modules 250, 252 and/or storage unit 254 as described herein may include or be stored in memory, such as random access memory (RAM), read only memory (ROM), programmable read only memory (PROM), erasable programmable read only memory (EPROM), electronically erasable programmable read only memory (EEPROM), flash memory, and/or may comprise executable instructions for causing the one or more processors to perform the actions attributed to them.

Additionally, any of the modules described herein may also include one or more processors, such as one or more microprocessors, digital signal processors (DSPs), application specific integrated circuits (ASICs), field programmable gate arrays (FPGAs), or any other equivalent integrated or discrete logic circuitry, as well as any combinations of such components.

Storage unit 254 may be configured to receive and store collected or aggregated traffic flow data from an individual network device. For example, storage unit 254 of one of the children A-PODs 38 in hierarchy 60 is configured to receive and store collected traffic flow data from BNG 23 as described in FIG. 1. Analysis module 252 may analyze the collected traffic data stored in storage unit 254. For example, analysis module 252 may aggregate or summarize the collected traffic flow data stored in storage unit 254 as aggregated traffic flow data. Policy module 250 may determine to output collected and/or aggregated traffic flow data stored in storage unit 254 based on the policies defined in policy module 250. In some examples, policy module 250 may have an automated policy, a query policy, and a trigger policy. For example, policy module 250 may output aggregated traffic flow data based on a query received from the parent A-POD 38 in hierarchy 60 or central analytics system 40. In some examples, policy module 250 of a parent A-POD 38 may also determine whether to output the query to other children A-PODs 38.

Storage unit 254 may be configured to receive and store collected or aggregated traffic flow data from an individual network device and one or more children A-POD 38's. For example, storage unit 254 of the top-most parent A-POD 38 in hierarchy 60 is configured to receive and store collected traffic flow data from N-PE 30 and collected and/or aggregated traffic flow data from the two illustrated children A-PODs 38. Analysis module 252 may analyze the traffic data stored in storage unit 254. For example, analysis module 252 may aggregate or summarize the traffic flow data including traffic flow data from one of the children A-PODs 38 and the individual network device stored in storage unit 254 as aggregated traffic flow data.

As described above, policy module 250 may determine whether to output collected and/or aggregated traffic flow data stored in storage unit 254 based on the policies defined in policy module 250. In some examples, policy module 250 may have an automated output policy, a query output policy, and a trigger output policy. For example, based on a query output policy, policy module 250 may output aggregated traffic flow data based on a query received from a parent A-POD 38 or from central analytics system 40. In some examples, policy module 250 may receive the query from the parent A-POD 38 or from central analytics system 40. In these examples, policy module 250 may also determine whether to output the query to any respective children A-PODs 38 in hierarchy 60. These queries may, in some cases, comprise simple aggregate queries or more complex queries.

Based on the automated output policy, policy module 250 determine, based on a policy-based time interval, when and/or how often to send collected (e.g., raw storage data) or aggregated summary data to a parent A-POD 38 or to central analytics system 40. Any particular parent A-POD 38, after receiving data from one or more children A-PODs either automatically or in response to a query, may aggregate and store such data (e.g., in a cache) for use in processing top-level queries that arrive from a parent A-POD or from central analytics system 40.

In various examples, A-PODs 38 may be arranged in one or more hierarchies, or hierarchical arrangements, as indicated in FIGS. 2-3. In these examples, the highest level A-POD 38 in each of these one or more hierarchies may be referred to as a parent A-POD 38, and the A-PODs 38 in respective lower levels of the hierarchies may be referred to as child A-PODs 38 with respect to the higher-level parent A-PODs 38. Of course, any given A-POD 38 may be at an intermediate level of a given hierarchy, in which case such an A-POD 38 may be both a parent A-POD with respect to its children, but may also be a child A-POD with respect to its parent.

In these examples, a parent A-POD 38 may collect, summarize, or otherwise aggregate flow traffic data, which includes data obtained from one or more of its children, as well as any locally collected flow data of the parent A-POD 38. A-PODs 38 may be allocated to individual network devices, such as by a resource manager, and the hierarchies of the A-PODs 38 may be based on the topology of the network that includes the individual network devices. A-PODs 38 may be geographically dispersed within the network and may serve as leafs and/or top-most nodes in one or more hierarchies.

As one non-limiting example, a network may include various network devices that are dispersed throughout a campus (e.g., university campus), and a data center may also include a network device. The network devices across the campus, as well as the network device in the data center, may each be coupled to a respective A-POD 38, where the A-POD 38 in the data center may serve as a highest-level parent A-POD 38, and the A-PODs 38 coupled to the campus network devices may serve as children A-PODs 38 with respect to the highest-level A-POD 38. The children A-PODs 38 may collect and summarize flow data associated with their respective network devices, and the highest-level parent A-POD 38 may collect flow data associated with its network device. In some cases, any parent A-PODs 38 in the hierarchy may also collect and aggregate flow data that is automatically provided by one or more of its respective child A-PODs.

Upon receiving a query from a central analytics system 40 (e.g., if central analytics system 40 is connected to the network device in the data center), the highest-level parent A-POD 38 may send the query to each of the child A-PODs 38 across campus, which then collect and provide aggregated summary or result data back to the highest-level parent A-POD 38. This may be done recursively, such that if a given child A-POD 38 also is a parent of one or more other child A-PODs 38, the child A-POD 38 may send the query down to its children, collect the aggregated data provided by its children, and pass the aggregated data to its parent A-POD 38 up in the hierarchy until it reaches the highest-level parent A-POD 38 in the data center. In such fashion, the highest-level parent A-POD 38 coupled to the data center may collect and aggregate the traffic data received from the various branches of the hierarchy via the child A-PODs 38 in response to a given query.

Figure 4:
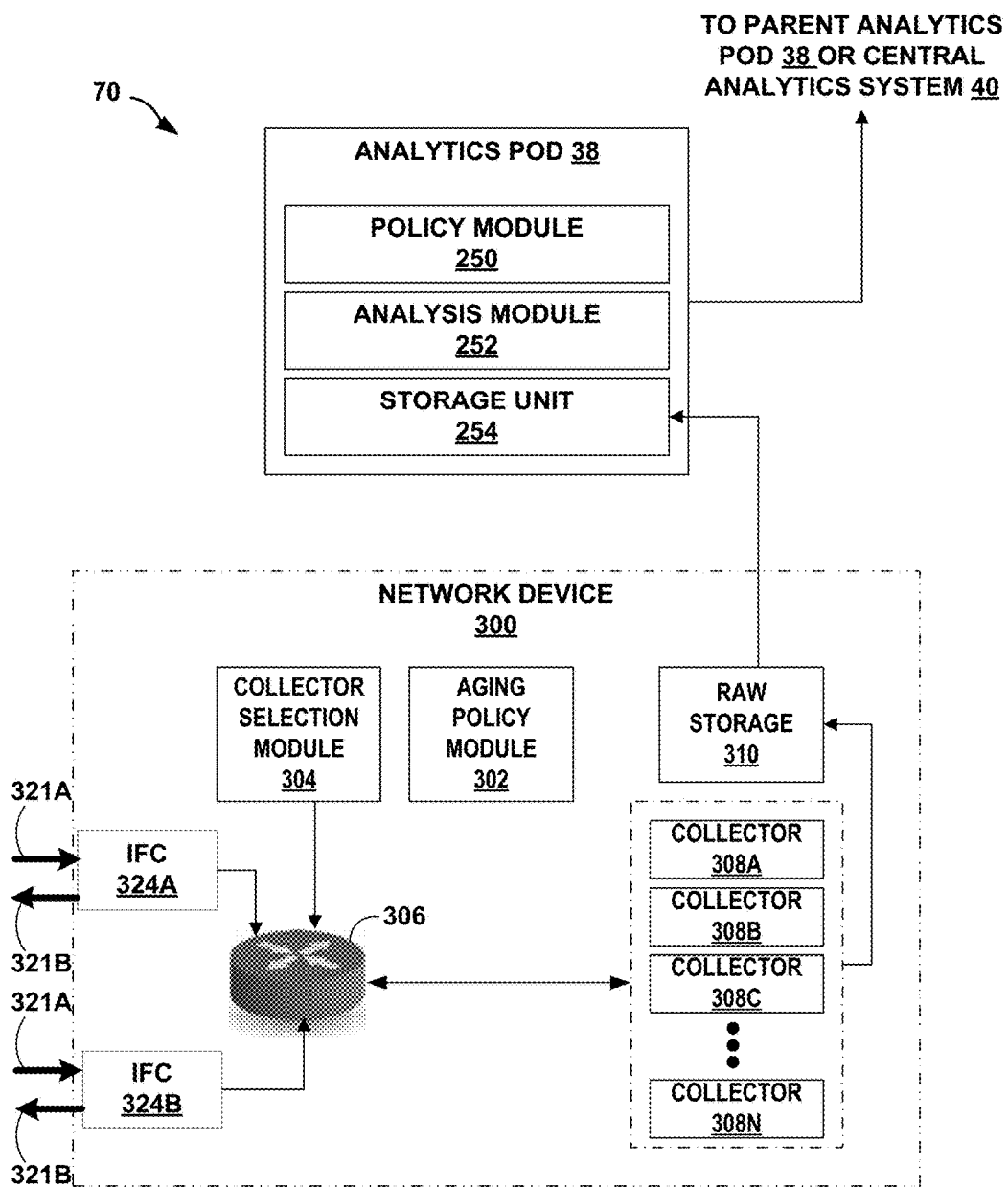
FIG. 4 is a block diagram illustrating further details of a relationship between an analytics pod and a network device in a distributed analytics system, in accordance with techniques of the disclosure.

FIG. 4 is a block diagram illustrating further details of relationship 70 between an A-POD and a network device 300 in the distributed analytics system, in accordance with techniques of the disclosure. FIG. 4 is described with reference to FIG. 3. In the example of FIG. 4, relationship 70 may include a relationship between A-POD 38 and A-PE 36 as described in FIG. 1A. A-POD 38 includes policy module 250, analysis module 252, and storage unit 254 as described in FIG. 3. As illustrated in FIG. 4, storage unit 254 of A-POD 38 is connected to network device 300, e.g., A-PE 36 as described in FIG. 1A. However, storage unit 254 of A-POD 38 may be connected to any of the network devices described in FIGS. 1A and 1B, or any other suitable network device. Network device 300 may include aging policy module 302, collector selection module 304, router 306, collectors 308A-308N (collectively "collectors 308"), and raw storage 310.

Any of the modules, storage unit 254, collectors 308, and raw storage 310 as described herein may include or be stored in memory, such as random access memory (RAM), read only memory (ROM), programmable read only memory (PROM), erasable programmable read only memory (EPROM), electronically erasable programmable read only memory (EEPROM), or flash memory, and/or may comprise executable instructions for causing the one or more processors to perform the actions attributed to them.

Additionally, any of the modules described herein may also include one or more processors, such as one or more microprocessors, digital signal processors (DSPs), application specific integrated circuits (ASICs), field programmable gate arrays (FPGAs), or any other equivalent integrated or discrete logic circuitry, as well as any combinations of such components.

Network device 300 may comprise a fully functional network router that receives packets and forwards the packets to a next hop according to routing tables. Alternatively, network device 300 may comprise another network device, such as a gateway, switch, hub, workstation, or the like. In some cases, network device 300 comprises a computer dedicated solely to analyze traffic flows.

In the embodiment of FIG. 4, network device 300 is configured with interface cards (IFCs) 324A-324B (IFCs 324), although the disclosure is not limited in that respect. For example, IFCs 324 may be removably inserted into a chassis that houses network device 300. The use of IFCs 324 can provide scalability to network device 300, and may allow different types of network interfaces to be supported. Each IFC 324 may include ports for receiving and transmitting signals over communication links 321A and 321B, such as uni-directional optical signals, although the disclosure is not limited in that respect.

Network device 300 receives inbound packets via inbound ports of IFCs 324, and collector selection module 304 may control router 306 to provide the inbound packets to one or of collectors 308. Collectors 308 may generate (e.g., collect) traffic flow data based on the received packets, and outputs traffic flow data to raw storage 310. More specifically, upon receiving an inbound packet, collector selection module 304 may retrieve and read one or more blocks of data, referred to as the "key," that defines the packet flow associated with the packet. The key may, for example, typically comprises the header of the packet, and may contain a variety of information including, for example, the source and destination address for the packet, MPLS labels, VPN labels, Class of Service (CoS) information, and the like. Collector selection module 304 may control router 306 based on the key, and may forward the key to one or more of collectors 308, which compute and maintain traffic flow data for defined packet flows.

Collectors 308 generate the traffic flow data based on the received packets. In particular, using the keys, collectors 308 may associate the received packets with respective packet flows, and updates statistics for the packets flows. As described previously, in various examples, a packet flow can be defined by values used in a header of a packet, such as the network "five-tuple," i.e., a source IP address, destination IP address, source port and destination port that are used to route packets through the physical network, and a communication protocol. Collectors 308 may maintain one or more of the following for each defined packet flow: an accurate packet count, a byte count, the source IP address, the destination IP address, the next hop IP address, input interface information, output interface information, total octets sent, flow start time, flow end time, source and destination port numbers, TCP flags, IP type of service, originating AS, source address prefix mask bits, destination address prefix mask bits, or the like. Additionally, other routing information within the packets may be used to define the packet flows for which flow statistics are maintained, such as MPLS labels, VPN labels, Class of Service (CoS) information, and the like. In general, statistics for particular packet flows can be maintained to a level of granularity desired for effective traffic analysis.

Collectors 308 may also further generate aggregated traffic flow data based on traffic flow data that is accumulated over time. In particular, after a given period of time, which may be fixed or dynamic, aging policy module 302 may output the collected or aggregated traffic flow data and discard the accumulated traffic flow data for packet flows being monitored. In some examples, the traffic flow data is output to storage unit 254 of A-POD and A-POD 38 may examine the outputted traffic flow data.

Collector selection module 304 and other components of network device 300 may operate, in certain examples, according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The functions of network device 300 may be implemented by executing the instructions of the computer-readable medium with one or more processors, discrete hardware circuitry, firmware, software executing on a programmable processor, or a combination of any of the above.

The distributed analytics system described herein may be highly scalable. In some non-limiting examples, the distributed system may use A-PODs 38 to keep track of all collectors and data sources (e.g., networking devices) in the network, and may then map each data type a network device emits to a specific instance of a collector and track how many records per second (RPS) the collector can handle and how much raw storage the collector is allocated. The distributed system may be able to dynamically re-allocate collectors and grow associated storage nodes.

In some examples, the distributed system may provide the ability for policy-based availability and geo-redundancy. That is, the system may be able to allocate as many collectors to a particular network device as required (e.g., collectors 308 for network device 300). In some examples, failure of a single collector of a network device may result in a failover to a backup collector, in which case a new backup collector may be allocated within the distributed system. In some examples, the underlying storage for the collectors may be highly available and may be configured with a system defined replication factor.

In some examples, A-PODs 38 may be dynamically allocated by a resource manager based on the computational complexity of the query and the number of A-PODs 38 available to it. In some examples, the distributed analytics system may be configured to replicate A-PODs 38 to a geographically diverse location for disaster recovery purposes. The replication model (active-active or eventual consistency) used may be determined based on the bandwidth allocated between different sites.

In some examples, the distributed analytics system may implement an aging policy which dictates how long data is kept in its raw form in one or more of collectors, such as collectors 308. Based on the policy, data might be aged out by computing summaries and/or aggregates of the data and storing those in place of the raw data. In this way, the aging policy may result in a large saving in data storage capacities.

Figure 5:
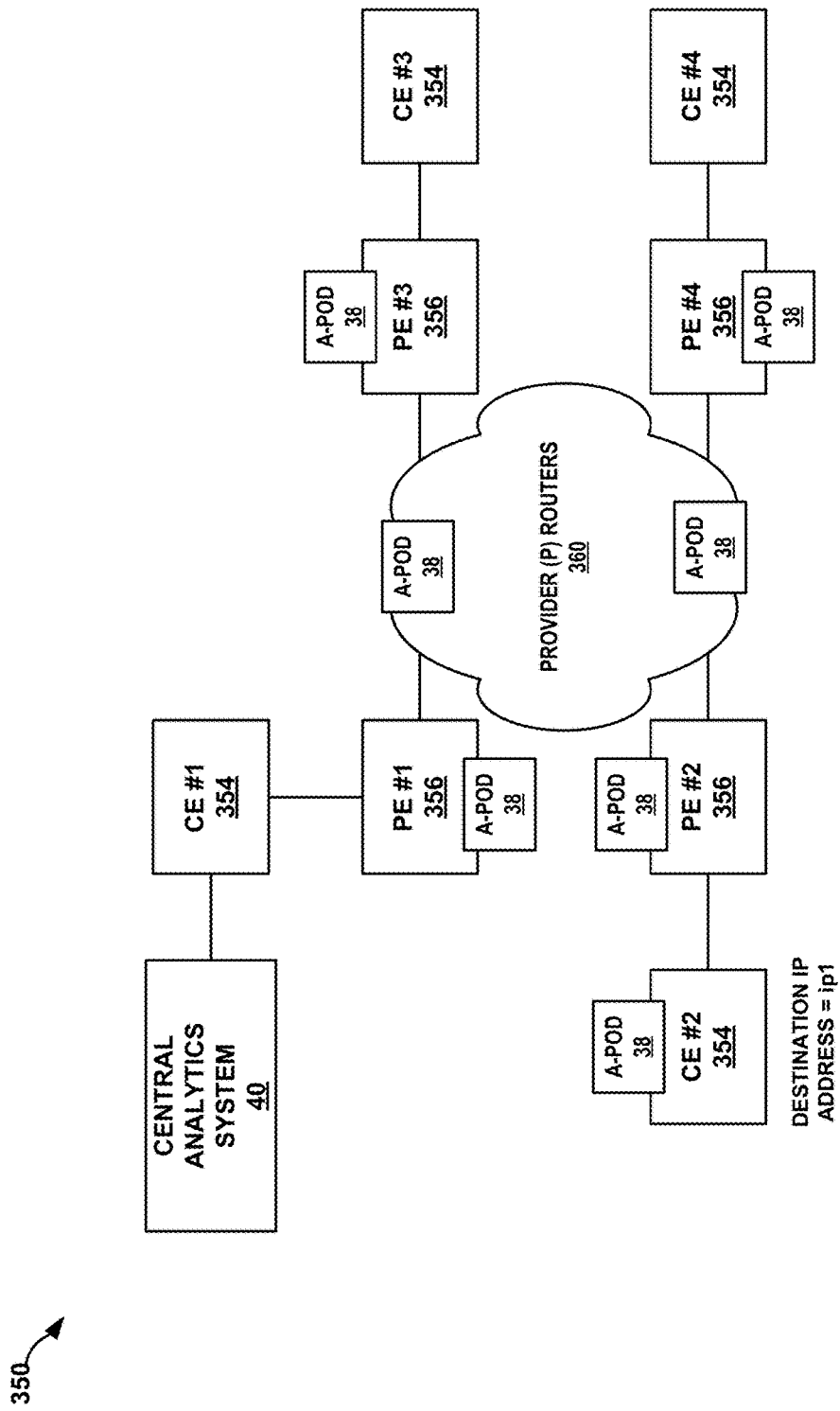
FIG. 5 is a block diagram illustrating another example network that includes a distributed analytics system, in accordance with techniques of the disclosure.

FIG. 5 is a block diagram illustrating another example network 350 that includes a distributed analytics system, in accordance with techniques of the disclosure. The distributed analytics system illustrated in FIG. 5 is shown for purposes of illustration only in network 350, but may, in certain examples, be similarly implemented in various other networks, such as the network shown in FIG. 1A.

As shown in FIG. 5, network 350, which may, in some examples, comprise an MPLS network providing a WAN, where network 350 includes various customer edge (CE) routers 354, such as the CE routers labelled CE #1, CE #2, CE #3, and CE #4. Network 350 further includes various provider edge (PE) routers 356, such as the PE routers labelled PE #1, PE #2, PE #3, and PE #4. Each of CEs 354 is coupled to a respective PE 356. For example, CE #1 is coupled to PE #1, CE #2 is coupled to PE #2, CE #3 is coupled to PE #3, and CE #4 is coupled to PE #4. CE #1 is also coupled to central analytics system 40. In addition, each of PEs 356 is also coupled to a network of one or more provider (P) routers 360. In this example, each of CEs 354 and PEs 356, as well as each of P routers 360, may comprise a network device, such as network device 300 shown in FIG. 4.

Furthermore, various A-PODs 38 may be coupled to one or more of CEs 354 and/or PEs 356. For instance, in the example of FIG. 5, an A-POD 38 is coupled to PE #1, an A-POD 38 is coupled to PE #2, an A-POD 38 is coupled to PE #3, an A-POD 38 is coupled to PE #4, and an A-POD 38 is coupled to CE #2. Although not shown in this example, A-PODs 38 may also be coupled to CE #1, CE #3, and/or CE #4, in some examples. Furthermore, as illustrated in FIG. 5, one or more A-PODs 38 may also be coupled to the one or more P routers 360.

Any of CEs 354 may serve as a data source at a customer premises, and PEs 356 may be geographically distributed across network 350. As one non-limiting use case example, a system administrator or user of central analytics system 40 may wish to know how much traffic has been sent to, but did not actually arrive, at the destination IP address "ip1" associated with CE #2 (e.g., for a device that is connected to CE #2). Attempting to determine this traffic by centralizing flow data (e.g., IPFIX data) for analysis may be costly within network 350, as CEs 354 may be separated by a WAN from a carrier network, and as PEs 356 are geographically distributed.

According to certain techniques, for the purposes of the example in FIG. 5, it may be assumed that CEs 354 are clock synchronized, such as by using the Point-to-Point Tunneling Protocol (PPTP). In addition, each outgoing packet from a given CE 354 may include timestamp data. CEs 354 and PEs 356 are capable of utilizing one or more collectors (e.g., collectors 308) to collect flow data (e.g., IPFIX data) in accordance with the five-tuple structure (i.e., source IP address, destination IP address, source port and destination port that are used to route packets through the physical network, and a communication protocol).

In FIG. 5, each of CE #1, CE #2, CE #3, CE #4, PE #1, PE #2, PE #3, and PE #4, and, in some cases, also P routers 360, may collect such data, where, the flow data may be stored by the A-POD 38 coupled to each respective router (e.g., in storage unit 254) according to a columnar data store or data structure named, in this example, "flow_records_raw" which, in some cases, also includes a field delineating the time period when the flow data was captured by the respective A-POD 38. For example, this field may indicate the last time at which flow data was received for a given flow, and it may also indicate the last time at which flow data was sent for this flow. In "flow_records_raw," for each flow, the source IP address, the source port, the destination IP address, and the destination port for the respective flow data may have field names of "src_ip," "src_port," "dest_ip," "and dest_port," respectively.

For this non-limiting example in which the user of central analytics system 40 wishes to know how much traffic has been sent to, but did not actually arrive, at the destination IP address "ip1" associated with CE #2 (e.g., for a device that connected to CE #2), central analytics system 40 may (e.g., based on user input) construct a query (e.g., Structured Query Language (SQL) query) comprising a SELECT statement to select the source IP address, the source port, the destination IP address, and the destination port from "flow_records_raw," where the destination IP address is "ip1" (associated with CE #2). The SELECT statement may be the following: "SELECT src_ip, src_port, dest_ip, dest_port FROM flow_records_raw WHERE (dest_ip='ip1').'" As such, the query may be based on the five-tuple information. In some cases, the query may also specify a time-based criterion. For example, the query may request only more recently collected flow data (e.g., only flow data that was received by an A-POD 38 on or after a particular point in time).

Central analytics system 40 may then send this query, via query processor 212 and query distributor and aggregator module 214, over network 350 to various ones of A-PODs 38 shown in FIG. 5. For example, central analytics system 40 may send the query to A-POD 38 coupled to PE #1, the A-POD 38 coupled to PE #2, the A-POD 38 coupled to PE #3, the A-POD 38 coupled to PE #4, and the A-POD 38 coupled to CE #2, which is the CE that is associated with the destination IP address "ip1."

Each of these A-PODs 38 are capable of executing the query on the "flow_records_raw" flow data that is processed and/or stored by the respective A-POD 38. Each of these A-PODs 38 is configured to return the respective query results to query distributor and aggregator module 214 of central analytics system 40, which is coupled to CE #1. In many instances, these results may be considerably smaller in size than actual packet data or even the raw flow table information in the "flow_records_raw" tables stored at the each of the A-PODs 38.

Upon receiving the results, query distributor and aggregator module 214 and/or analytics application 218 may store part or all of the result data in application database 216. In addition, query distributor and aggregator module 214 and/or analytics application 218 may, in this example, add each of the data sets from PE #1, PE #2, PE #3, and PE #4 and subtract, from this, the flow data collected from A-POD 38 coupled to CE #2, and may also store the calculated results in application database 216. The result of such subtraction is the traffic that did not make it to CE #2, in response to the query, and this result may indicate data loss in network 350.

In various examples, A-PODs 38 connected to PE #1, PE #2, PE #3, PE #4, and CE #2 may each serve as highest-level A-PODs 38 that receive a query from central analytics system. In certain cases, any of these A-PODs 38 may also serve as parent A-PODs 38 to one or more children A-PODs 38 in one or more respective hierarchies, such as the hierarchies shown in FIGS. 2-3, based on network topology information or characteristics. A parent A-POD 38 may collect, summarize, or otherwise aggregate flow traffic data, which includes data obtained from one or more of its children, as well as any locally collected flow data of the parent A-POD 38, either automatically or in response to a query, such as a query from central analytics system 40. If an A-POD 38 is a child A-POD, it may receive the query from its parent A-POD 38 in the hierarchy, rather than directly from central analytics system 40, and may provide summary flow data back up to its parent A-POD 38 in the hierarchy.

In some examples, where various A-PODs 38 are connected to P routers 360 (e.g., one A-POD 38 for a corresponding one of P routers 360), these A-PODs 38 may serve as one or more child A-PODs with respect to one or more respective parent A-PODs connected to one or more PEs 356 according to one or more hierarchical arrangements. In these examples, the child A-PODs 38 of P routers 360 may provide aggregated flow data, either automatically or in response to a query, to the respective parent A-PODs 38, which may then provide aggregated flow data back to central analytics system 40 in response to a query, such as described in the processes above.

Figure 6:
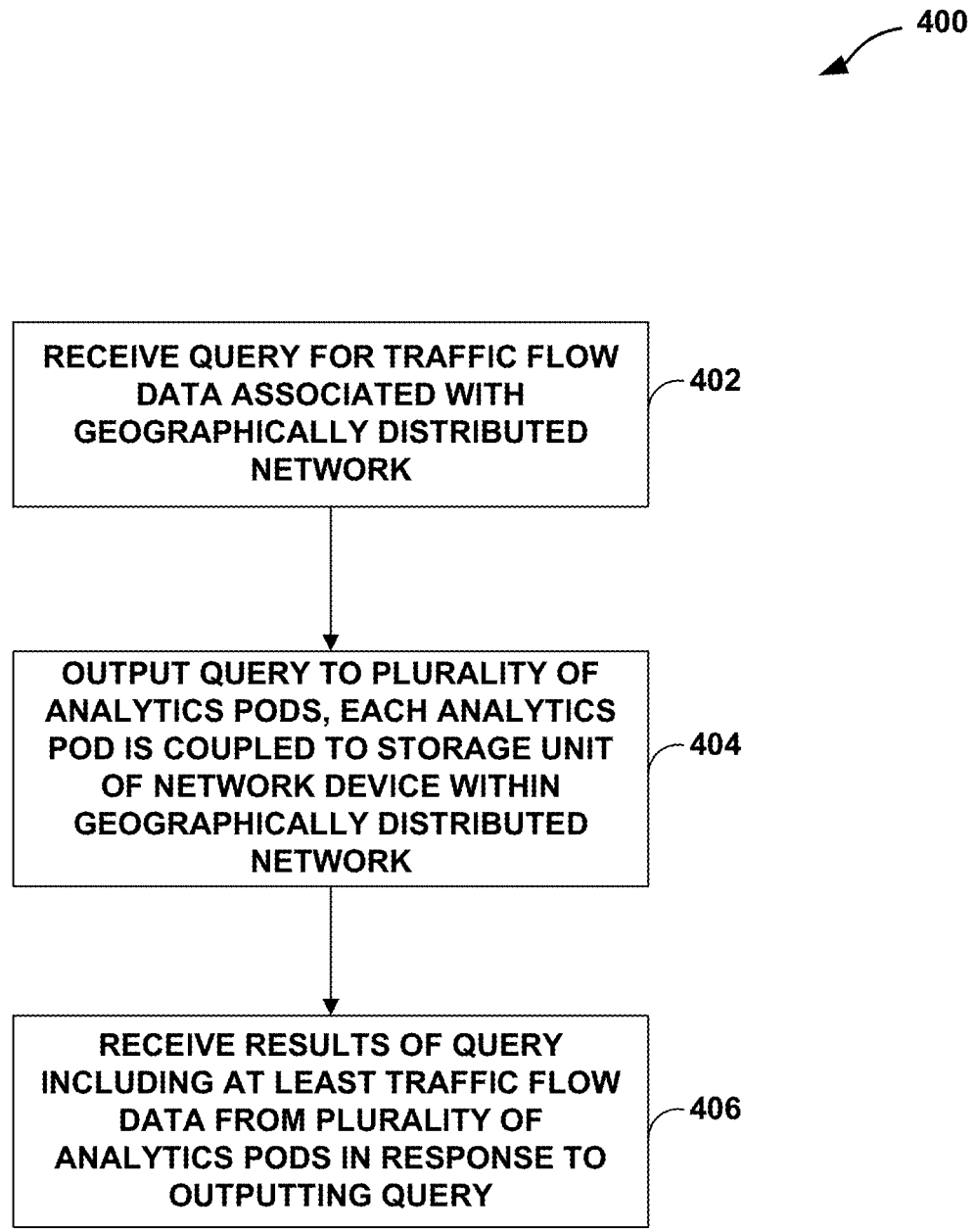
FIG. 6 is a flowchart illustrating example operations of a distributed analytics system, in accordance with techniques of the disclosure.

FIG. 6 is a flowchart illustrating example operations 400 of the distributed analytics system, in accordance with techniques of the disclosure. For purposes of illustration only, FIG. 6 is described with reference to FIG. 2.

Central analytics system 40 may receive a query for traffic flow data associated with a distributed network of network devices (e.g., distributed network 50) (402). Central analytics system 40 may output the query to a plurality of A-PODs 38 (404). Each of the A-PODs 38 may be coupled to a storage unit of a network device within the distributed network. Central analytics system 40 may receive results of the query from the A-PODs 38 in response to outputting the query (406). The results may include at least the traffic flow data from the A-PODs 38 based on the query.

Additionally, in some examples, central analytics system 40 may determine a subset A-PODs 38 that receive the query, where outputting the query to the A-PODs 38 includes outputting the query to the subset of A-PODs 38. For example, central analytics system 40 may determine the subset of A-PODs 38 that receive the query by determining topology information based on a topology of the distributed network of network devices, and may determine the subset of A-PODs 38 that receive the query based at least on the topology information. Central analytics system 40 may also receive the results from the subset of A-PODs 38, where the results include at least the traffic flow data from the subset of A-PODs based on the query.

In some examples, determining the subset of A-PODs 38 that receive the query may include determining, by central analytics system 40, topology information based on a topology of the distributed network of network devices, and determining, by central analytics system 40, the subset of A-PODs 38 that receive the query based at least on the topology information. Determining the subset of A-PODs 38 that receive the query may further include determining, by central analytics system 40, route information (e.g., information included in routes database 208) associated with the distributed network of network devices, and determining, by central analytics system 40, the subset of A-PODs 38 that receive the query further based on the route information. Before outputting the query to the subset of A-PODs 38, central analytics system 40 may receive flow data associated with the route information from one or more of the subset of A-PODs 38.

In some examples, the subset of A-PODs 38 are arranged in one or more hierarchical arrangements (e.g., arrangements illustrated in FIGS. 2 and 3) based on the topology of the distributed network, and the subset of A-PODs 38 include at least one parent analytics pod in the one or more hierarchical arrangements, the at least one parent analytics pod being associated with one or more child A-PODs 38 in the one or more hierarchical arrangements. In some cases, central analytics system 40 may send the topology information to the subset of A-PODs 38. Central analytics system 40 may also aggregate the results to generate an aggregated response to the query.

In some examples, receiving the query for the traffic flow data includes receiving, by central analytics system 40, the query for the traffic flow data associated with a plurality of data flows in the distributed network, and receiving the results of the query includes receiving, by central analytics system 40 and from A-PODs 38, at least a portion of the traffic flow data for each of the plurality of data flows. The query may comprise a query for first and second portions of the traffic flow data associated with respective first and second data flows of the plurality of data flows in the distributed network, and receiving at least the portion of the traffic flow data associated with each of the plurality of data flows may include receiving, by central analytics system 40 and from A-PODs 38, the first and second portions of the traffic flow data associated with the respective first and second data flows.

The first portion of the traffic flow data associated with the first data flow may include one or more of a number of packets associated with the first data flow, a number of bytes associated with the first data flow, a time of capturing a first packet for the first data flow, or a time of capturing a most recent packet for the first data flow, and the second portion of the traffic flow data associated with the second data flow may include one or more of a number of packets associated with the second data flow, a number of bytes associated with the second data flow, a time of capturing a first packet for the second data flow, or a time of capturing a most recent packet for the second data flow.

In some examples, receiving the results of the query may include receiving, by central analytics system 40 and from a first A-POD of A-PODs 38, a first portion of the traffic flow data, and receiving, by central analytics system 40 and from a second A-POD of A-PODs 38, a second portion of the traffic flow data. Central analytics system 40 may aggregate the first and second portions of the traffic flow data.

In some examples, before outputting the query to A-PODs 38, central analytics system 40 may determine, based on a role-based access control mechanism, to output the query to A-PODs 38, wherein the role-based access control mechanism identifies a role of a user associated with the query. The results from A-PODs 38 may include at least the traffic flow data from one or more collectors of at least one network device coupled to A-PODs 38 or a summary of the data from the one or more collectors.

In some examples, the query received by central analytics system 40 specifies at least one of a source Internet Protocol (IP) address, a source port, a destination IP address, and a destination port associated with the traffic flow data. The query may also specify a time-based criterion associated with the traffic flow data.

Figure 7:
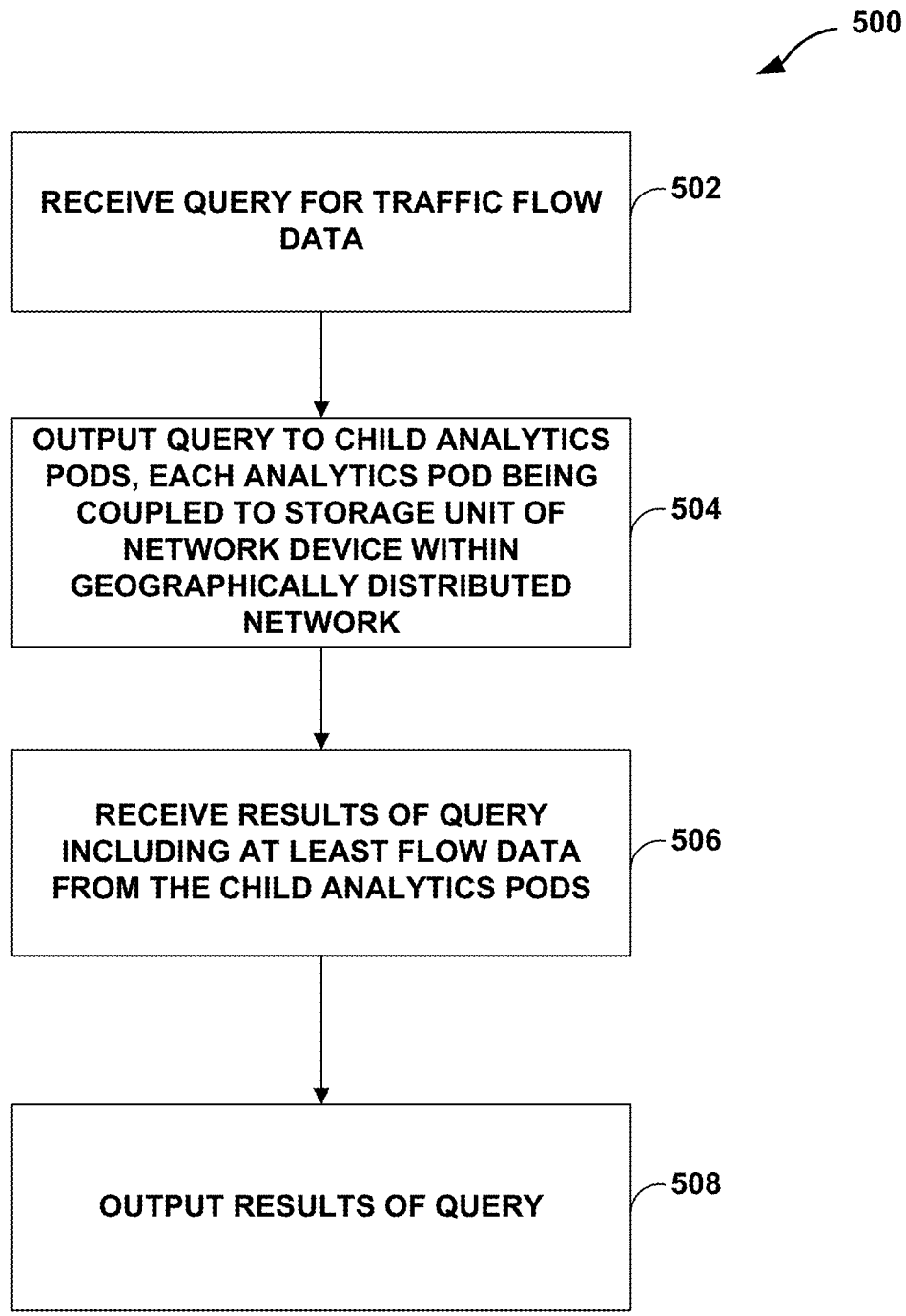
FIG. 7 is a flowchart illustrating further example operations of a distributed analytics system, in accordance with techniques of the disclosure.

FIG. 7 is a flowchart illustrating further example operations of a distributed analytics system, in accordance with techniques of the disclosure. For purposes of illustration only, FIG. 7 is described with reference to FIG. 2.

A particular A-POD 38 may receive, from central analytics system 40, a query for traffic flow data (502). This A-POD 38 is included in a hierarchical arrangement of A-PODs that are each coupled to a storage unit of a network device within distributed network 50 of network devices, such as one of the hierarchical arrangements illustrated in FIG. 2 (e.g., the hierarchical arrangement of A-PODs in LEVELS 1-N). The A-POD that receives the query may be the parent A-POD 38 at LEVEL 1 of this arrangement. This hierarchical arrangement is based on a topology of distributed network 50.

In this example, the parent A-POD 38 outputs the query to one or more child A-PODs 38 associated with the parent A-POD 38 (504), such as, for example, one or more of the child A-PODs 38 at LEVEL 2 in the hierarchical arrangement. The one or more child A-PODs 38 are children of the parent A-POD 38 in the hierarchical arrangement.

Responsive to outputting the query, the parent A-POD 38 receives, from the one or more child A-PODs, results of the query (506). The results include at least flow data from the one or more child A-PODs. The parent A-POD 38 is then able to output, to central analytics system 40, the results of the query (508).

In some examples, outputting the query to the one or more child A-PODs 38 includes identifying, by the parent A-POD 38, child A-PODs 38 associated with the parent A-POD in the hierarchical arrangement, and outputting, by the parent A-POD 38 pod, the query to the child A-PODs 38, where receiving the results of the query may include receiving, by the parent A-POD 38 and from the child A-PODs 38, the results of the query, the results including at least the flow data from the child A-PODs 38. Outputting the query to the child A-PODs 38 may include outputting, by the parent A-POD 38, a first query to a first child A-POD 38 of the child A-PODs 38, and outputting, by the parent A-POD 38, a second query to a second child A-POD 38 of the child A-PODs 38. Receiving the results of the query may include receiving, by the parent A-POD 38 and from the first child A-POD 38, results of the first query that include flow data from the first child A-POD 38, and receiving, by the parent A-POD 38 and from the second child A-POD 38, results of the second query that include flow data from the second child A-POD 38. Outputting the results of the query includes aggregating, by the parent A-POD 38, the results of the first query with the results of the second query, and sending, by the parent A-POD 38 and to central analytics system 40, the aggregated results.

In some examples, the parent A-POD 38 may determine, based on the query, traffic flow data associated with the parent A-POD 38. In these examples, outputting the results of the query may include aggregating, by the parent A-POD 38, the results received from the one or more child A-PODs 38 with the traffic flow data associated with the parent A-POD 38, and outputting, by the parent A-POD 38, the aggregated results to central analytics system 40.

In some examples, the traffic flow data associated with the parent A-POD 38 includes at least one of data from one or more collectors of the network device coupled to the parent A-POD 38 or a summary of the data from the one or more collectors of the network device. In addition, in some cases, the parent A-POD 38 may receive, from central analytics system 40, topology information associated with the topology of the distributed network, and determine, based on the topology information, the hierarchical arrangement of A-PODs 38.

In addition, in various other examples of the present disclosure, a method includes generating, by an A-POD 38, traffic flow data associated with a geographically distributed network, wherein the A-POD 38 is coupled to a storage unit of a network device within the geographically distributed network, and automatically outputting, by the A-POD 38, results including the generated traffic flow data to one of a parent A-POD 38 of the A-POD 38 or central analytics system 40, wherein the parent A-POD 38 is a parent of the A-POD 38 within a hierarchy of A-PODs 38. The A-POD 38 receives at least a portion of the results from the one or more children A-PODs 38. Automatically outputting the results to one of the parent A-POD 38 or the central analytics system 40 may include aggregating at least a first portion of the results from the A-POD 38 and at least a second portion of the results from the one or more children A-PODs 38 to generate aggregated results, and automatically outputting the aggregated results to one of the parent A-POD 38s or the central analytics system 40. The results may, in some instances, include at least one of data from one or more collectors of the network device or a summary of the data from the one or more collectors of the network device.

Furthermore, in various other examples of the present disclosure, a method includes triggering, by an A-POD 38, an event for traffic flow data associated with a geographically distributed network, wherein the A-POD 38 is coupled to a storage unit of a network device within the geographically distributed network, responsive to the event, outputting, by the A-POD 38, results of the event to one of a parent A-POD 38 of the A-POD 38 or the central analytics system 40, wherein the parent A-POD 38 is a parent of the A-POD 38 within a hierarchy of A-PODs 38. The A-POD 38 may transmit the event to one or more children A-PODs 38, wherein the one or more children A-PODs 38 are children of the A-POD 38 within the hierarchy of the A-PODs 38, and the A-POD 38 may receive at least a portion of the results from the one or more children A-PODs 38 based on the event. Outputting the results of the event to one of the parent A-POD 38 or the central analytics system 40 may include aggregating at least a first portion of the results from the A-POD 38 and at least a second portion of the results from the one or more children A-PODs 38 to generate aggregated results to the event, and outputting the aggregated results to one of the parent A-PODs 38 or the central analytics system 40. The results of the event may, in some instances, include at least one of data from one or more collectors of the network device or a summary of the data from the one or more collectors of the network device.

In some examples, the query received by an A-POD 38 specifies at least one of a source Internet Protocol (IP) address, a source port, a destination IP address, and a destination port associated with the traffic flow data. The query may also specify a time-based criterion associated with the traffic flow data.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

The invention claimed is:

1. A method comprising:
   receiving, by a central analytics system, a query for traffic flow data associated with a geographically distributed network of network devices;
   outputting, by the central analytics system, the query to each of a plurality of analytics pods, wherein each of the plurality of analytics pods is coupled to a storage unit of a network device within the geographically distributed network, wherein each of the plurality of analytics pods is coupled to a plurality of collector devices that accumulate flow statistics of each traffic flow for traffic associated with the respective network device, wherein each type of data emitted by the respective network device is mapped to a specific collector device of the respective plurality of collector devices, wherein the plurality of analytics pods are arranged in hierarchical arrangements based on a determined topology of the distributed network, and wherein each of the plurality of analytics pods comprises a highest-level analytics pod that is associated with one or more lower-level analytics pods in a respective one of the hierarchical arrangements; and
   responsive to outputting the query, receiving, by the central analytics system and from the plurality of analytics pods, aggregated results of the query, wherein the aggregated results include at least the traffic flow data from the plurality of analytics pods based on the query.

2. The method of claim 1, further comprising:
   determining, by the central analytics system, a subset of analytics pods of the plurality of analytics pods that receive the query,
   wherein outputting the query to the plurality of analytics pods comprises outputting, by the central analytics system, the query to the subset of analytics pods,
   wherein receiving the aggregated results from the plurality of analytics pods comprises receiving, by the central analytics system and from each of the subset of analytics pods, one or more of the aggregated results, and
   wherein the method further comprises aggregating, by the central analytics system, the one or more of the aggregated results received from each of the subset of analytics pods to generate an aggregated response to the query.

3. The method of claim 2, wherein determining the subset of analytics pods that receive the query comprises:
   determining, by the central analytics system, topology information based on the topology of the distributed network of network devices; and
   determining, by the central analytics system, the subset of analytics pods that receive the query based at least on the topology information.

4. The method of claim 3, wherein determining the subset of analytics pods that receive the query further comprises:

determining, by the central analytics system, route information associated with the distributed network of network devices; and determining, by the central analytics system, the subset of analytics pods that receive the query further based on the route information.

5. The method of claim 3,
wherein the subset of analytics pods includes the highest-level analytics pod in the respective one of the hierarchical arrangements, the highest-level analytics pod being associated with the one or more lower-level analytics pods in the respective one of the hierarchical arrangements.

6. The method of claim 1,
wherein the query comprises a query for first and second portions of the traffic flow data associated with respective first and second data flows of a plurality of data flows in the distributed network,
and wherein receiving the aggregated results of the query comprises receiving, by the central analytics system and from the plurality of analytics pods, the first and second portions of the traffic flow data associated with the respective first and second data flows.

7. The method of claim 6,
wherein the first portion of the traffic flow data associated with the first data flow comprises one or more of a number of packets associated with the first data flow, a number of bytes associated with the first data flow, a time of capturing a first packet for the first data flow, or a time of capturing a most recent packet for the first data flow, and
wherein the second portion of the traffic flow data associated with the second data flow comprises one or more of a number of packets associated with the second data flow, a number of bytes associated with the second data flow, a time of capturing a first packet for the second data flow, or a time of capturing a most recent packet for the second data flow.

8. The method of claim 1, wherein receiving the aggregated results of the query comprises:
receiving, by the central analytics system and from a first analytics pod of the plurality of analytics pods, a first portion of the traffic flow data; and
receiving, by the central analytics system and from a second analytics pod of the plurality of analytics pods, a second portion of the traffic flow data,
wherein the method further comprises aggregating, by the central analytics system, the first and second portions of the traffic flow data.

9. The method of claim 1, wherein the query received by the central analytics system specifies at least one of a source Internet Protocol (IP) address, a source port, a destination IP address, and a destination port associated with the traffic flow data.

10. The method of claim 1, wherein the query received by the central analytics system specifies a time-based criterion associated with the traffic flow data.

11. A central analytics system, comprising:
at least one processor; and
a computer-readable storage medium storing instructions that are executable by the at least one processor to:
receive a query for traffic flow data associated with a geographically distributed network of network devices;
output the query to each of a plurality of analytics pods, wherein each of the plurality of analytics pods is coupled to a storage unit of a network device within the geographically distributed network, wherein each of the plurality of analytics pods is coupled to a plurality of collector devices that accumulate flow statistics of each traffic flow for traffic associated with the respective network device, wherein each type of data emitted by the respective network device is mapped to a specific collector device of the respective plurality of collector devices, wherein the plurality of analytics pods are arranged in hierarchical arrangements based on a determined topology of the distributed network, and wherein each of the plurality of analytics pods comprises a highest-level analytics pod that is associated with one or more lower-level analytics pods in a respective one of the hierarchical arrangements; and
responsive to outputting the query, receive, from the plurality of analytics pods, aggregated results of the query, wherein the aggregated results include at least the traffic flow data from the plurality of analytics pods based on the query.

12. The central analytics system of claim 11,
wherein the at least one processor is further configured to determine a subset of analytics pods of the plurality of analytics pods that receive the query,
wherein the at least one processor is configured to output the query to the plurality of analytics pods at least by outputting the query to the subset of analytics pods,
wherein the at least one processor is configured that receive the aggregated results from the plurality of analytics pods at least by receiving, from each of the the subset of analytics pods, one or more of the aggregated results, and
wherein the at least one processor is further configured to aggregate the one or more of the aggregated results received from each of the subset of analytics pods to generate an aggregated response to the query.

13. The central analytics system of claim 12, wherein the at least one processor is configured to determine the subset of analytics pods that receive the query at least by determining topology information based on the topology of the distributed network of network devices, and determining the subset of analytics pods that receive the query based at least on the topology information.

14. The central analytics system of claim 13, wherein the at least one processor is further configured to determine the subset of analytics pods that receive the query at least by determining route information associated with the distributed network of network devices, and determining the subset of analytics pods that receive the query further based on the route information.

15. The central analytics system of claim 13,
wherein the subset of analytics pods includes the highest-level analytics pod in the respective one of the hierarchical arrangements, the highest-level analytics pod being associated with the one or more lower-level analytics pods in the respective one of the hierarchical arrangements.

16. The central analytics system of claim 11,
wherein the query comprises a query for first and second portions of the traffic flow data associated with respective first and second data flows of a plurality of data flows in the distributed network,
and wherein the at least one processor is configured to receive the aggregated results of the query at least by receiving, from the plurality of analytics pods, the first and second portions of the traffic flow data associated with the respective first and second data flows.

17. The central analytics system of claim 11,
wherein the at least one processor is configured to receive the aggregated results of the query at least by receiving a first portion of the traffic flow data from a first analytics pod of the plurality of analytics pods, and receiving a second portion of the traffic flow data from a second analytics pod of the plurality of analytics pods, and
wherein the at least one processor is further configured to aggregate the first and second portions of the traffic flow data.

18. A method comprising:
receiving, by an analytics pod and from a central analytics system, a query for traffic flow data, wherein the analytics pod is included in a hierarchical arrangement of analytics pods that are each coupled to a storage unit of a network device within a distributed network of network devices, wherein the hierarchical arrangement is based on a topology of the distributed network, and wherein the analytics pod comprises a highest-level analytics pod that is associated with one or more lower-level analytics pods in the hierarchical arrangement of analytics pods, the one or more lower-level analytics pods comprising one or more child analytics pods that are children of the analytics pod;
outputting, by the analytics pod, the query to each of the one or more child analytics pods;
responsive to outputting the query, receiving, by the analytics pod and from the one or more child analytics pods, results of the query, wherein the results include at least flow data from the one or more child analytics pods;
aggregating, by the analytics pod, the results received from the one or more child analytics pods; and
outputting, by the analytics pod and to the central analytics system, the aggregated results of the query.

19. The method of claim 18,
wherein outputting the query to the one or more child analytics pods comprises:
 outputting, by the analytics pod, a first query to a first child analytics pod of a plurality of child analytics pods; and
 outputting, by the analytics pod, a second query to a second child analytics pod of the plurality of child analytics pods,
wherein receiving the results of the query comprises:
 receiving, by the analytics pod and from the first child analytics pod, results of the first query that include flow data from the first child analytics pod; and
 receiving, by the analytics pod and from the second child analytics pod, results of the second query that include flow data from the second child analytics pod, and
wherein aggregating the results received from the one or more child analytics pods comprises aggregating, by the analytics pod, the results of the first query with the results of the second query.

20. The method of claim 18, further comprising:
determining, by the analytics pod and based on the query, traffic flow data associated with the analytics pod,
wherein outputting the aggregated results of the query comprises aggregating, by the analytics pod, the results received from the one or more child analytics pods with the traffic flow data associated with the analytics pod.

21. The method of claim 18, further comprising:
receiving, by the analytics pod and from the central analytics system, topology information associated with the topology of the distributed network; and
determining, by the analytics pod and based on the topology information, the hierarchical arrangement of analytics pods.

22. A device comprising:
at least one processor, wherein the at least one processor is configured to:
 receive, from a central analytics system, a query for traffic flow data, wherein the device comprises an analytics pod that is included in a hierarchical arrangement of analytics pods that are each coupled to a storage unit of a network device within a distributed network of network devices, wherein the hierarchical arrangement is based on a topology of the distributed network, and wherein the analytics pod comprises a highest-level analytics pod that is associated with one or more lower-level analytics pods in the hierarchical arrangement of analytics pods, the one or more lower-level analytics pods comprising one or more child analytics pods that are children of the analytics pod;
 output the query to each of the one or more child analytics pods;
 responsive to outputting the query, receive, from the one or more child analytics pods, results of the query, wherein the results include at least flow data from the one or more child analytics pods;
 aggregate the results received from the one or more child analytics pods; and
 output, to the central analytics system, the aggregated results of the query.

23. The device of claim 22,
wherein the at least one processor is configured to output the query to the one or more child analytics pods at least by outputting a first query to a first child analytics pod of a plurality of child analytics pods, and outputting a second query to a second child analytics pod of the plurality of child analytics pods,
wherein the at least one processor is configured to receive the results of the query at least by receiving results of the first query that include flow data from the first child analytics pod, and receiving results of the second query that include flow data from the second child analytics pod, and
wherein the at least one processor is configured to aggregate the results received from the one or more child analytics pods at least by aggregating the results of the first query with the results of the second query.

24. The device of claim 22,
wherein the at least one processor is further configured to determine, based on the query, traffic flow data associated with the analytics pod, and
wherein the at least one processor is configured to output the aggregated results of the query at least by aggregating the results received from the one or more child analytics pods with the traffic flow data associated with the analytics pod.

25. The device of claim 22, wherein the at least one processor is further configured to:
receive, from the central analytics system, topology information associated with the topology of the distributed network; and determine, based on the topology information, the hierarchical arrangement of analytics pods.

\* \* \* \* \*